Oct. 26, 1937. G. W. RATHJENS 2,097,422
SEPARATING MATERIALS, SEGREGATING MATERIALS, AND CONTACTING MATERIALS
Filed May 6, 1935 8 Sheets-Sheet 3
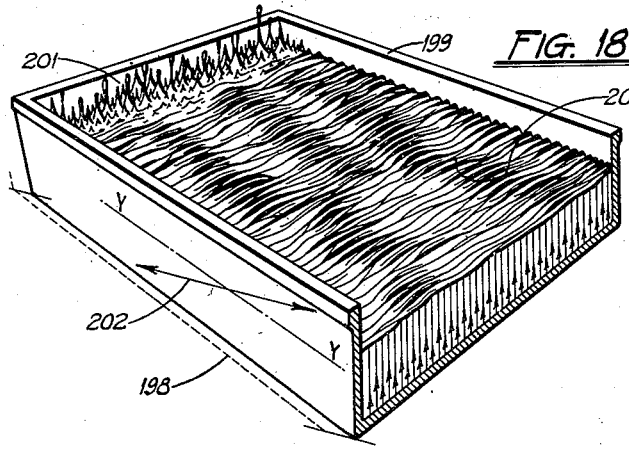
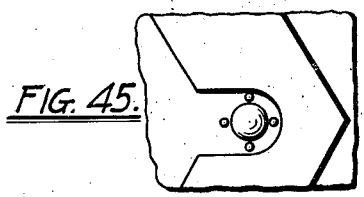
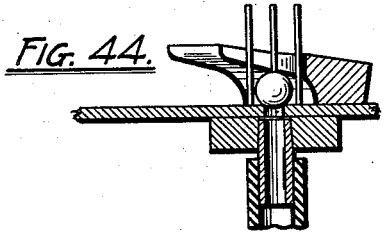
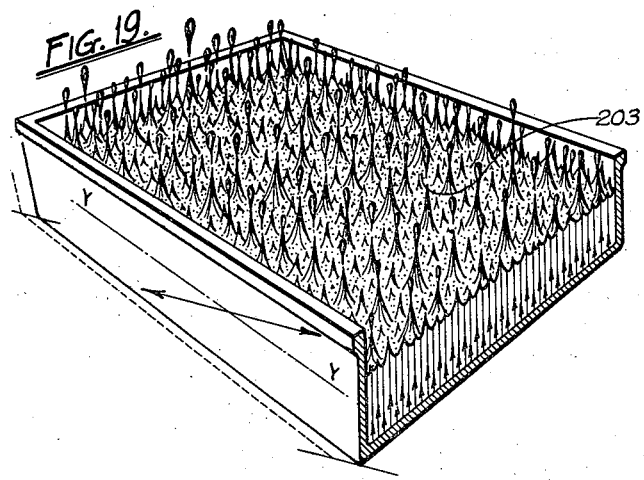
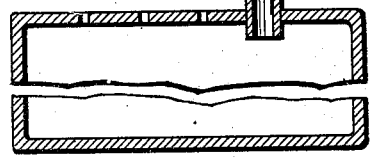
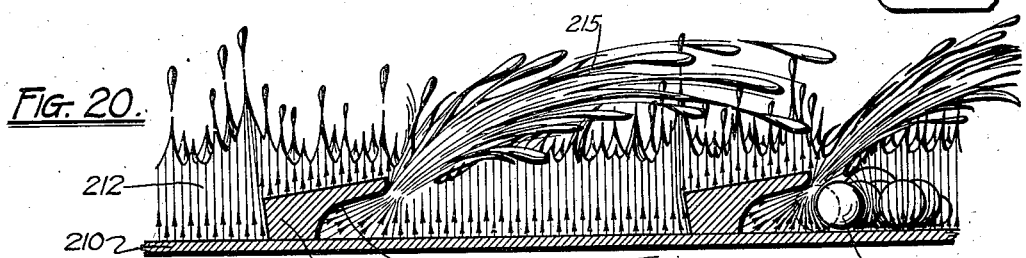
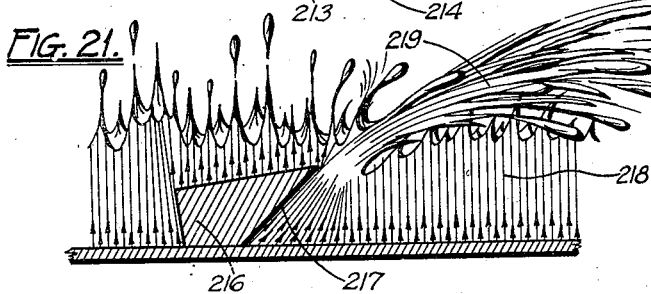
INVENTOR
G. W. RATHJENS.
BY
ATTORNEY Oct. 26, 1937.                G. W. RATHJENS                2,097,422
SEPARATING MATERIALS, SEGREGATING MATERIALS, AND CONTACTING MATERIALS
Filed May 6, 1935                    8 Sheets-Sheet 4

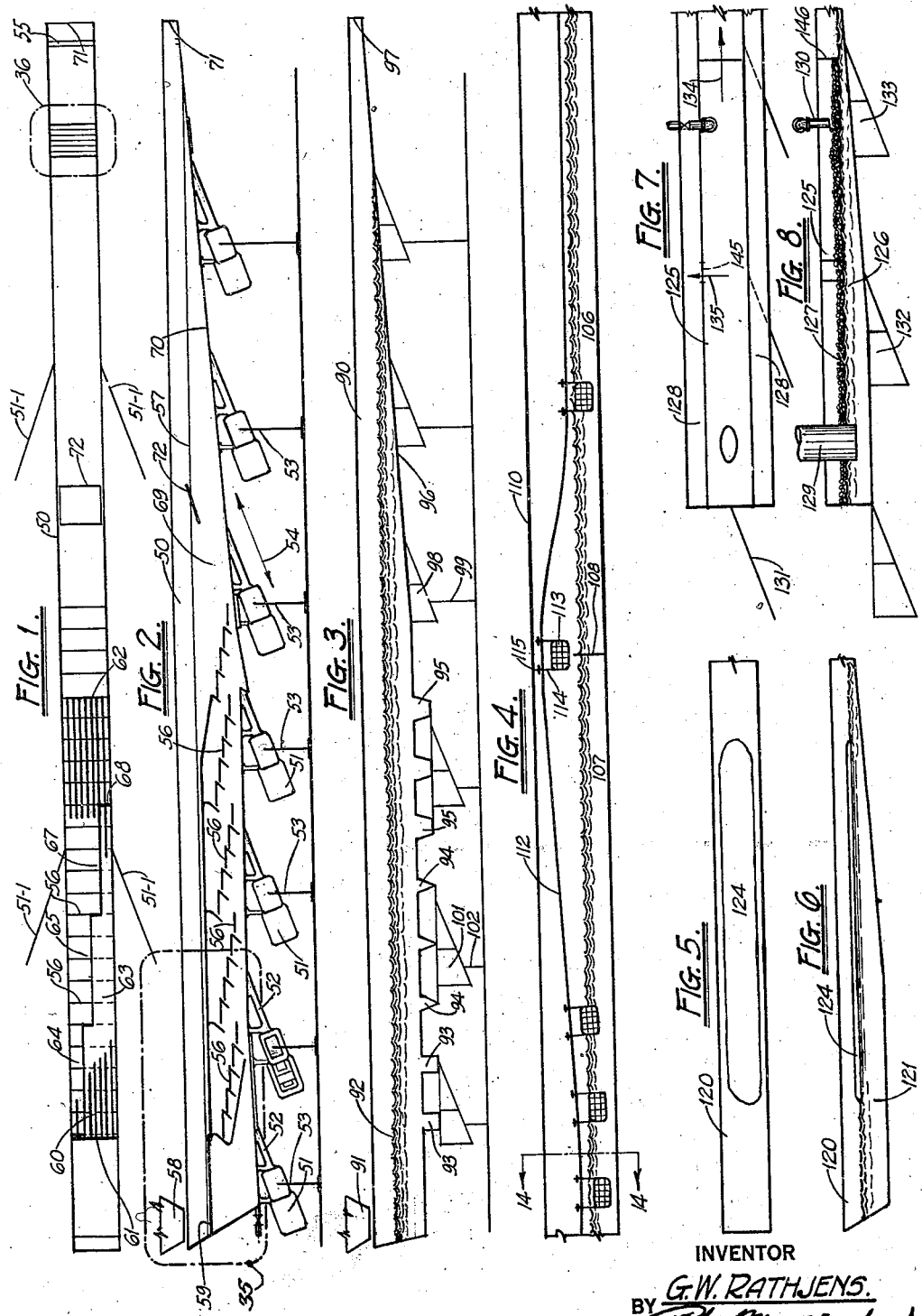

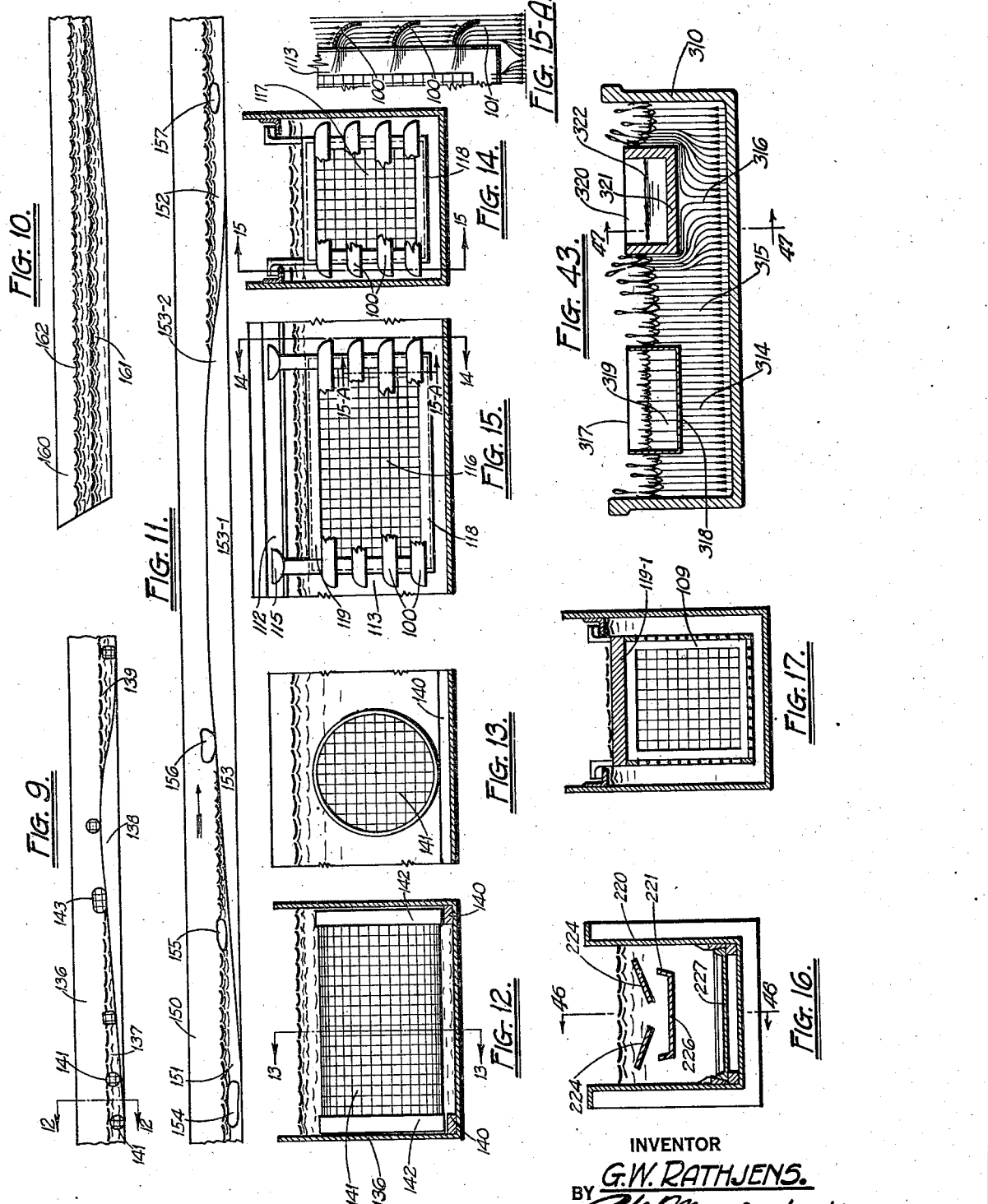

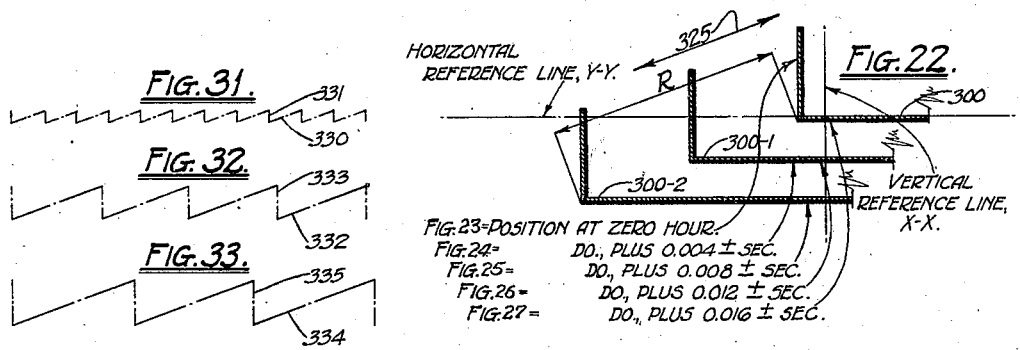
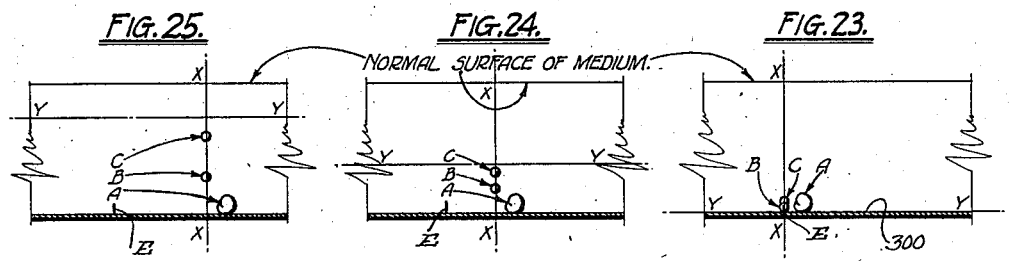
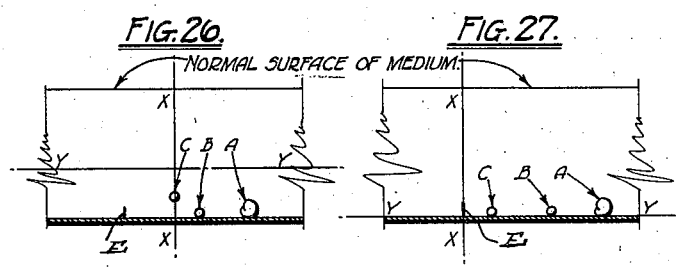
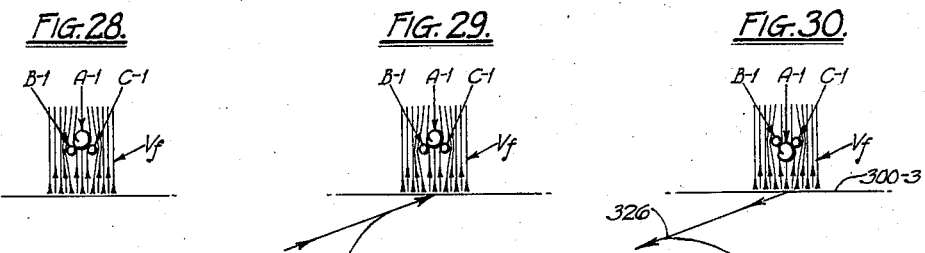

UPON APPROACHING OTHER PARTICLES "B" & "C" MOMENTARILY NOT FALLING, HEAVIER PARTICLE "A" HAS TENDENCY TO DISPLACE SAME BECAUSE OF ITS MOMENTUM AND EFFECT OF Vf. RELATIVE POSITIONS OF THREE PARTICLES ARE SHOWN AT MOMENT OF CONTACT.

DIRECTION OF MOVEMENT OF PLANE. ZERO HOUR +.016 SECOND MINUS A DIFFERENTIAL INCREMENT OF TIME.

DIRECTION OF MOVEMENT OF PLANE. ZERO HOUR +.016 SECOND PLUS A DIFFERENTIAL INCREMENT OF TIME.

INVENTOR
G.W. RATHJENS.
BY
ATTORNEY

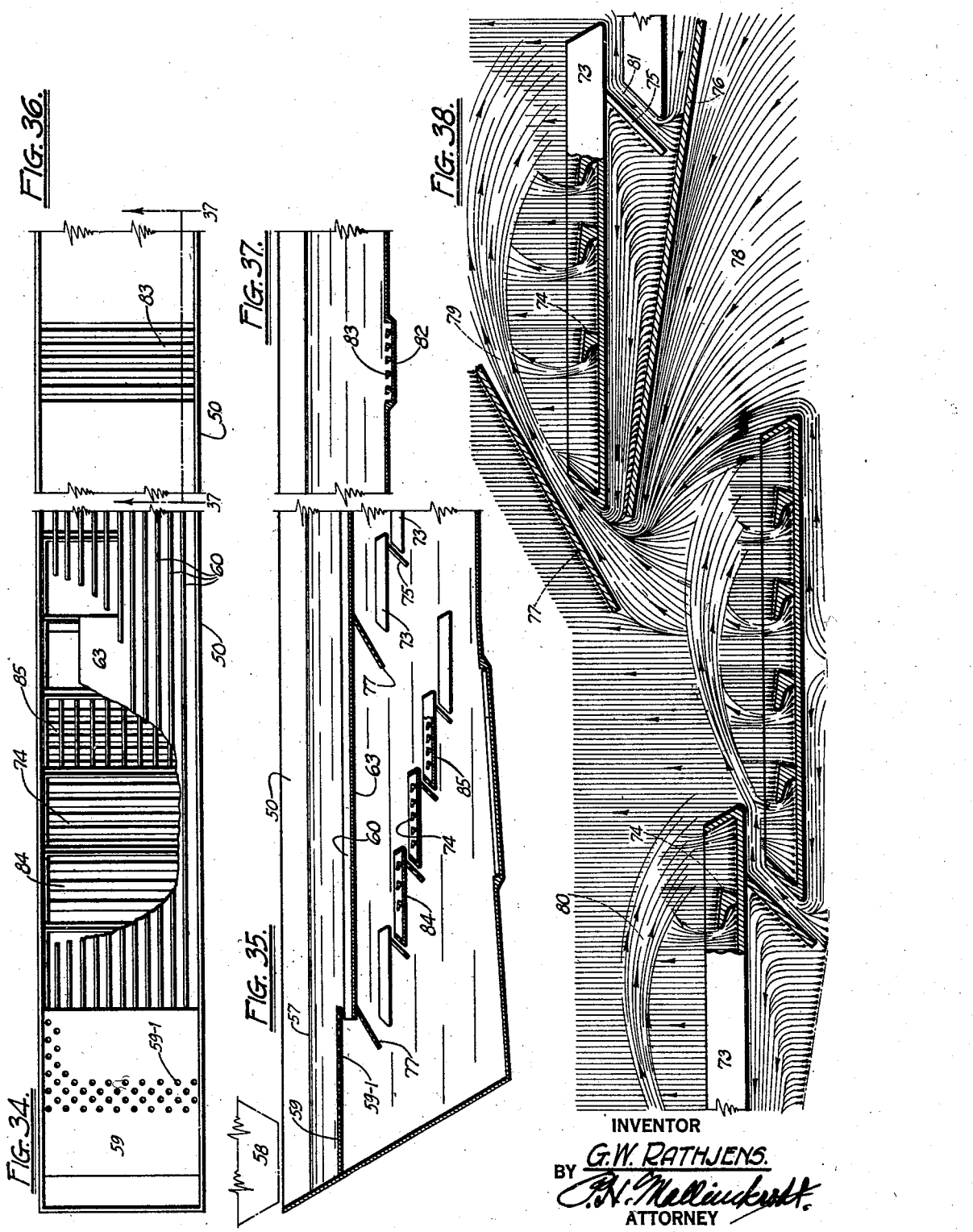

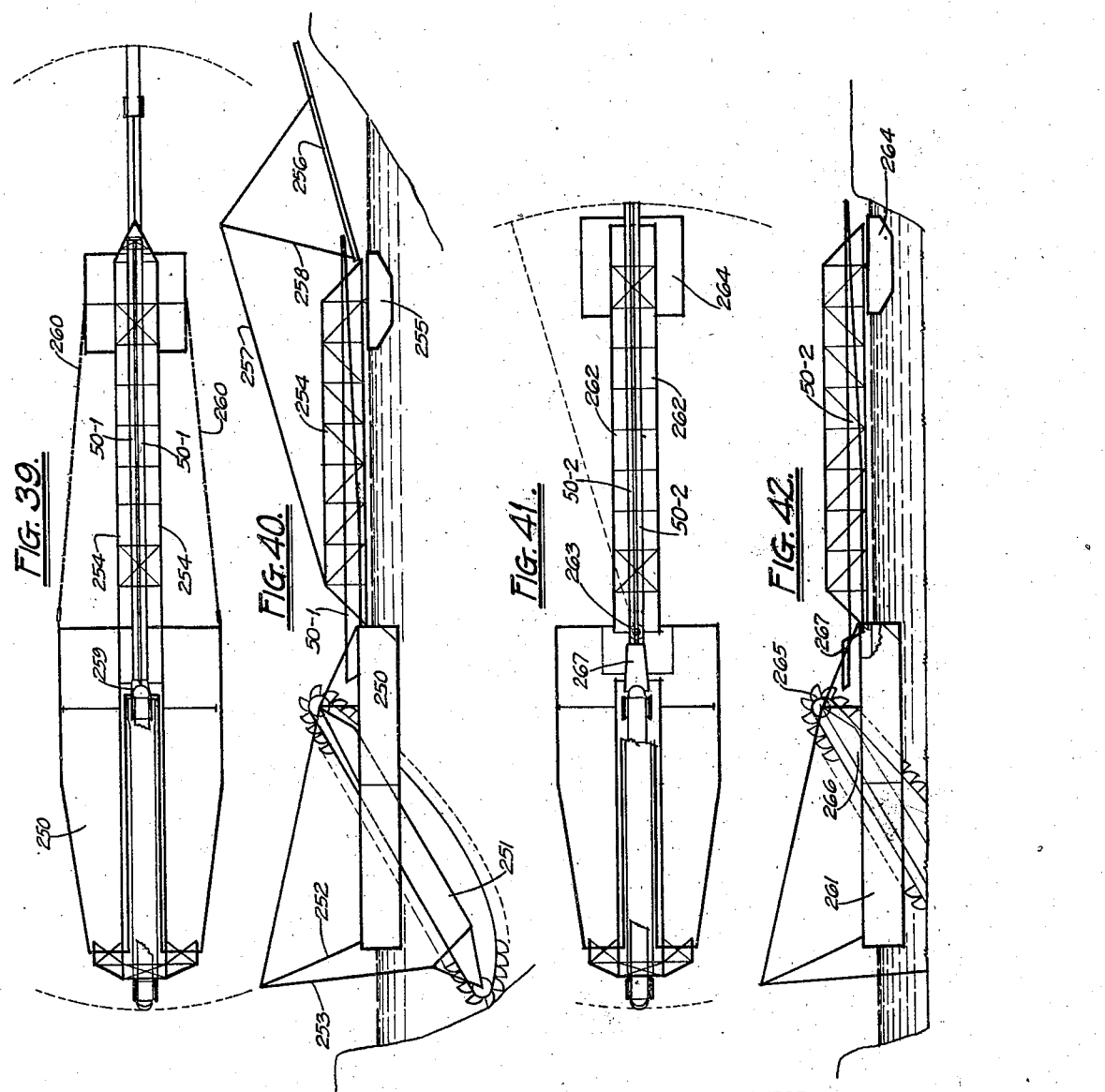

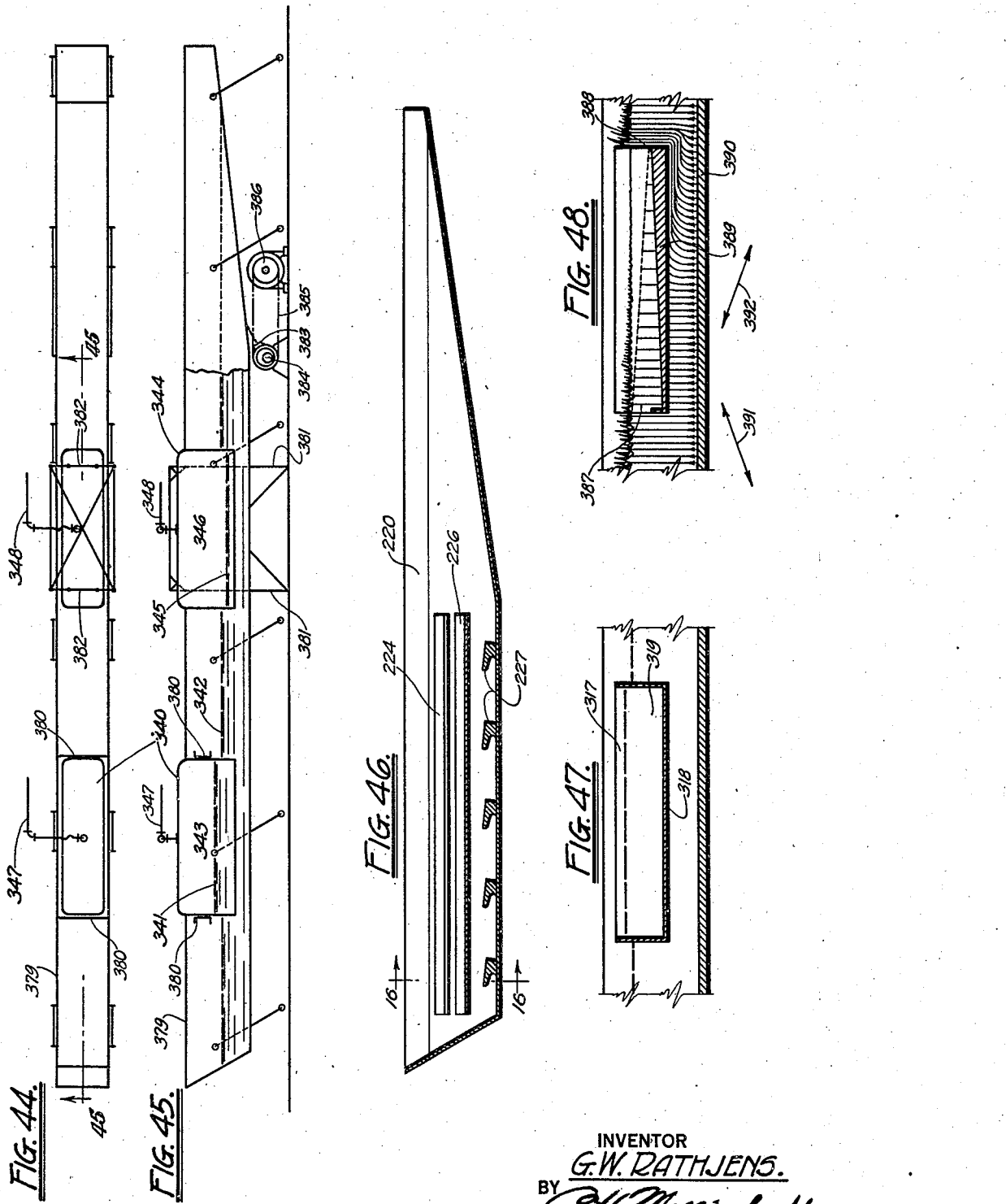

Oct. 26, 1937.   G. W. RATHJENS   2,097,422
SEPARATING MATERIALS, SEGREGATING MATERIALS, AND CONTACTING MATERIALS
Filed May 6, 1935   8 Sheets-Sheet 8
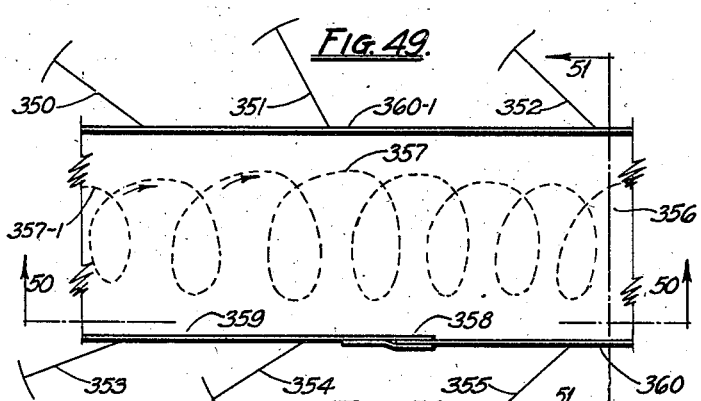
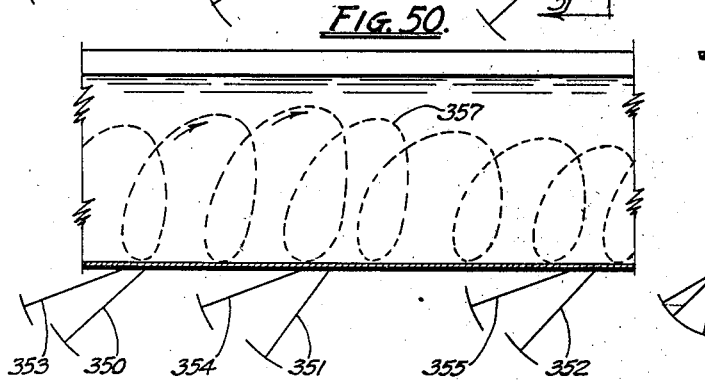
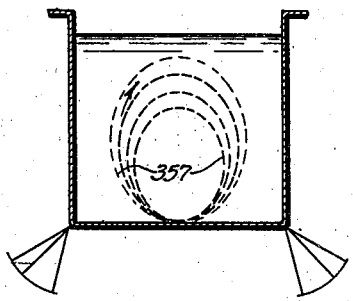
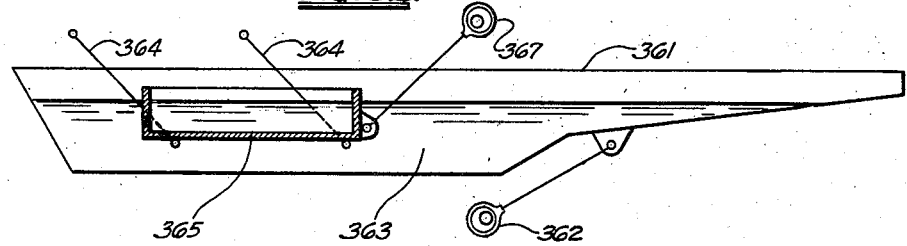
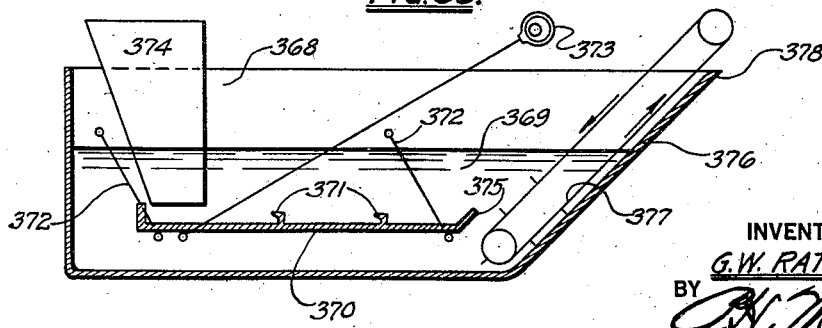
INVENTOR
G.W. RATHJENS
BY
ATTORNEY Patented Oct. 26, 1937

2,097,422

UNITED STATES PATENT OFFICE 2,097,422

SEPARATING MATERIALS, SEGREGATING MATERIALS AND CONTACTING MATERIALS

George W. Rathjens, Salt Lake City, Utah

Application May 6, 1935, Serial No. 20,043
In Canada May 7, 1934

20 Claims. (Cl. 209—437)

This invention relates to a process for separating materials, segregating materials, and contacting materials, and more particularly, a process which involves passing the materials into and through a peculiarly activated medium consisting of a confined body of liquid, or a substance having the properties of a liquid which is given rapid motion in a prescribed manner, all as is fully explained hereinafter.

The present application is a substitute for, and a continuation in part, of one filed by me in the U. S. Patent Office, June 17, 1933, Serial No. 676,218.

Among the principal objects of the invention are:

First.—To separate materials from one another within a medium consisting of a liquid or a substance having properties of a liquid, such as an emulsion, a colloid and so on, while at the same time, conserving the medium.

Second.—To make practical the saving of extremely fine material particles from other material particles.

Third.—To bring about a segregation or separation of materials having different physical characteristics.

Fourth.—To provide an efficient washing action wherever material objects are passed through a liquid.

Fifth.—To provide the washing action while at the same time causing the objects to be progressively transported through the liquid.

Sixth.—To practically keep materials in partial suspension in a medium so as to permit heavier particles to work down through or into the materials held in suspension.

Seventh.—To facilitate the segregation and removal of foreign substances from objects being washed.

Eighth.—To de-water substances of various kinds, but especially substances such as metallurgical pulps, metallurgical slimes, sewage, and the like.

Ninth.—To remove solids from liquids, including the equivalent of filtering and/or desliming.

Tenth.—To bring liquids into intimate contact with solids or vice versa, for the purpose of facilitating chemical reactions by or between them and physical actions upon them.

Eleventh.—To bring about conditions of substantial uniformity of saturation between liquid substances and solid substances or vice versa.

Twelfth.—To perform any one, or any combination of the functions just enumerated, in a substantially automatic and continuous manner.

The novel features of this invention depend upon the application of one and/or the other of two principles in the manipulation of a liquid or medium for the attainment of useful purposes.

The first principle is that the liquid or medium must be reciprocated in up-strokes and down-strokes alternating with one another and repeated at least so rapidly that the medium falls through a down-stroke faster than do certain of solid particles, introduced into, dispersed in, and passing through the medium, during the same down-stroke.

The second principle is that the rate of reciprocation must be at least so rapid, that the medium falls through a down-stroke faster than would be its fall through the same down-stroke under the influence of gravity alone. This is accomplished by withdrawing the support upon which the medium rests, faster than the medium could follow, due to gravity. Therefore, in each down-stroke, there is a tendency to create a vacuum between the bottom surface of the medium and the surface upon which the medium rests. Actually, of course, the formation of a vacuum does not take place because of the atmospheric or other pressure upon the upper surface of the medium. Due to the descent of the medium, energy is accumulated in every droplet thereof during each down-stroke.

At the reversal of each down-stroke, the movement of the medium is arrested, with the result that the accumulated energy manifests itself as a force which tends to dissipate itself through the medium in every direction, but which, if the medium is confined on all sides and the bottom, is normally directed straight up. For convenience in discussion, this force is hereinafter called "Vr", and various devices for modifying and controlling this force, are given in detail.

As a provision of this process, the liquid is confined in a container as a segregated, isolated mass, having a free top surface. Its identity remains substantially constant without functional depletion. The requisite motive force for reciprocating the liquid may be applied to the container in which the liquid is confined, or in some cases the container may remain stationary and the motivating force be applied to a plate or other body in contact with the liquid within the container.

Due to the operative peculiarities of this process the liquid provides an environment which governs the passage through it of substances foreign to the liquid, and at the same time holds some foreign substances in suspension if desired for establishing conditions where the forces induced are advantageously employed to cause the movement of the foreign substances through the said environment in predetermined paths. Thus the liquid acts in the capacity of a medium governing the behavior of foreign substances within it, but ordinarily imparts no motion to such substances.

The forces which are effective in the consideration of the first principle of this process are gravity and the mechanical result of the force exerted on the container or other moving body. The forces which are effective in the second consideration are those just mentioned, together with a third force represented by the atmospheric or other pressure on the top surface of the liquid under consideration. The term "$V_f$", in reality, represents the combined effect within the liquid of the aforesaid three forces.

By regulating the length of the strokes, their velocity, and the direction in which they are applied, the forces acting to motivate the foreign substances through the liquid, contrawise to its resistance, can be so adjusted by the provisions of this process that an almost complete control over both the behavior of the liquid and any foreign substances within it results. When the line of reciprocation is inclined within proper limits the greatest usefulness of this process is realized, as will be explained later on herein. In such cases the paths followed by the foreign substances through the liquid consist of serrations having substantially vertical portions and inclined portions alternating one with another.

Because the medium is a relatively static, confined body of liquid which is subjected to repeated downwardly accelerated impulses with instant reversals, different paths of travel will be imposed upon substances of different physical characteristics contained therein.

The material introduced into and operated upon by the liquid medium is herein variously referred to as material particles, solid particles, or foreign substances. Such terms refer in each instance to material foreign to the medium comprising an intimate mixture of individual units having physical characteristics usually differing greatly between respective units and capable of dispersion, i. e. separation, in the medium by the action of the forces of this process.

The accompanying drawings illustrate various forms of apparatus suited to the practice of the process.

In these drawings:

Fig. 1 represents a plan, in diagrammatic form, of a sluice or container for handling alluvial or placer gravels and sands in the recovery of gold, platinum, or other substances;

Fig. 2, a diagrammatic elevation thereof, the near side wall of the sluice having been removed to reveal the interior construction;

Fig. 3, a diagrammatic side elevation, the near side wall being omitted, of a sluice especially adapted for treating materials containing tin, precious stones and the like;

Fig. 4, a fragmentary diagrammatic side elevation of a trough or container confining a liquid or medium used for washing purposes, the near side wall being omitted to reveal the inside;

Fig. 5, a fragmentary plan in diagrammatic form, showing the effect of an elastic medium of relatively lesser specific gravity superimposed or floating on an inelastic medium of relatively greater specific gravity, such as a body of oil on top of a body of water confined in the sluice;

Fig. 6, an elevation in diagram, corresponding to Fig. 5, the near side wall being omitted;

Fig. 7, a fragmentary plan, in diagrammatic form, of a flotation apparatus;

Fig. 8, a diagrammatic side elevation corresponding to Fig. 7, the near side wall being omitted;

Fig. 9, a fragmentary portion of the side elevation of a container showing another arrangement for confining liquid for washing or similar purposes, the near side wall being omitted;

Fig. 10, a fragmentary portion of the side elevation of a container confining liquids or mediums of different specific gravities, one relatively inelastic medium being superimposed upon another relatively inelastic medium, the near side wall of the container being omitted;

Fig. 11, a fragmentary elevation similar to Fig. 9, but showing somewhat different conditions;

Fig. 12, a vertical cross section taken through a vibratory container on the line 12—12 in Fig. 9, and drawn to an enlarged scale in order to show structural details;

Fig. 13, a vertical section taken on line 13—13 in Fig. 12;

Fig. 14, a cross-section taken on the line 14—14 in Fig. 4, drawn to an enlarged scale, and on line 14—14 in Fig. 15, drawn to the same scale, parts being broken away for clarity.

Fig. 15, a section taken on the line 15—15 in Fig. 14, parts being broken away for clarity;

Fig. 15A, a fragmentary section taken on the line 15A—15A in Fig. 15, drawn to an enlarged scale;

Fig. 16, a cross section taken through a container, on the line 16—16 in Fig. 46, drawn to an enlarged scale, and showing the disposition of certain deflecting and modifying elements;

Fig. 17, a cross section showing a container similar to that in Fig. 14, but embodying certain modifications;

Fig. 18, a fragmentary portion, in perspective, of a container confining a medium, and illustrating approximately the effect upon the medium, when lines of force $V_f$, explained hereinafter, of relatively low intensity, are developed therein;

Fig. 19, a view similar to that in Fig. 18, but illustrating the effect of increasing the intensity of $V_f$;

Fig. 20, a fragmentary vertical section, taken through a container having a medium confined therein, and showing the operative effect of certain deflecting elements placed therein;

Fig. 21, a view similar to that in Fig. 20, but showing the effect of a different deflecting element;

Fig. 22, a diagram indicating a fragmentary portion of a container or sluice, in three different positions of one cycle of vibratory motion, the three positions being the uppermost, the lowermost and the intermediate;

Fig. 23, a diagram showing the assumed positions of three material particles having different physical characteristics, at the point where the container or sluice is in the uppermost position, that is to say, at the crest of a cycle of motion;

Fig. 24, a diagram similar to Fig. 23, but showing a change in position of the three material particles due to the downward and backward travel of the sluice to the intermediate position;

Fig. 25, another diagram similar to Fig. 23, showing a further change in position of the three material particles when the sluice has reached the lowermost position shown in Fig. 22;

Fig. 26, still another diagram similar to Fig. 23, but showing a still further change in the position of the three particles, due to the forward and upward travel of the sluice in again reaching the intermediate position;

Fig. 27, a final diagram showing the positions of the same three particles when the sluice has been returned to the uppermost or starting position at the beginning of another cycle;

Fig. 28, a diagram indicating assumed positions of several particles anywhere in the medium to illustrate another condition of separating materials from one another;

Fig. 29, a diagram similar to that in Fig. 28, showing substantially similar relations between similar particles individually, as in Fig. 28, but assuming the group to be located momentarily at the extreme upper end of a stroke, as indicated by the double-pointed arrow.

Fig. 30, a diagram showing the particles of Fig. 29 shortly after the sluice has commenced its downward travel, as indicated by the double-pointed, down-directed arrow 326;

Fig. 31, the delineation of the unobstructed path traveled through the medium by the particle C in Figures 23 to 27, each serration of the zigzag path representing one cycle of motion extending from the position indicated in Fig. 23 to the position indicated in Fig. 27;

Figs. 32 and 33, the delineations of the respective serrated paths described by the particles B and A, each serration representing one cycle of motion as in the case of particle C, in Fig. 31;

Fig. 34, a fragmentary plan corresponding to the portion enclosed by broken line 34 in Fig. 2, drawn to an enlarged scale and showing certain details differently from those indicated in Fig. 1; in this figure certain portions are shown broken away to reveal certain parts underneath;

Fig. 35, a vertical, longitudinal center section corresponding to Fig. 34;

Fig. 36, a fragmentary portion corresponding to that enclosed by the broken line 36 in Fig. 1, drawn to an enlarged scale and showing structural details;

Fig. 37, a vertical section taken on the line 37—37 in Fig. 36;

Fig. 38, a fragmentary, vertical, longitudinal section similar to a certain portion of Fig. 35, but drawn to an enlarged scale, and showing another arrangement of details, at the same time setting forth approximately the lines of activation created in the medium due to certain modifying elements placed in the paths of the induced force, Vr;

Fig. 39, a diagrammatic plan of a placer dredger having a sluice equipment in which the process of the present invention is employed; scale reduced;

Fig. 40, a diagrammatic side elevation corresponding to the plan in Fig. 39;

Fig. 41, a diagrammatic plan of a dredger of different type from the one shown in Fig. 39, but with a sluice equipment employing the process of the present invention; scale reduced;

Fig. 42, a diagrammatic side elevation corresponding to the plan in Fig. 41;

Fig. 43, a vertical cross section taken through a main container in conjunction with two smaller containers, each confining separately certain mediums, the smaller containers being afloat on the medium in the main container to illustrate the transformation of certain force effects.

Fig. 44, a plan, in diagrammatic form, of a sluice equipped with hoods for varying the fluid pressure on the surface of the medium;

Fig. 45, a vertical longitudinal section in diagrammatic form, taken on line 45—45 in Fig. 44;

Fig. 46, a longitudinal vertical section taken on line 46—46 in Fig. 16 drawn to a reduced scale;

Fig. 47, a longitudinal section taken on line 47—47 in Fig. 43, showing a supplementary vibratory member, and being drawn to a scale slightly reduced;

Fig. 48, a section similar to that shown in Fig. 47, but showing a supplementary vibratory member of another form;

Fig. 49, a fragmentary portion, largely in diagrammatic form, of the plan, of a sluice equipped with means for imposing curvilinear circuitous paths upon particles passing through the medium in the sluice;

Fig. 50, a diagrammatic, vertical, longitudinal section taken on the line 50—50 in Fig. 49;

Fig. 51, a cross section taken on the line 51—51 in Fig. 49;

Fig. 52, a diagrammatic, vertical, longitudinal section, of a vibratory sluice, showing a supplementary container partially submerged in the medium contained in the sluice, the supplementary container being actuated independently of the sluice;

Fig. 53, a diagrammatic vertical section showing a stationary container equipped with a suspended movable plate submerged in a medium confined in the container.

Referring to the drawings, Figs. 1, 2 and 34 to 38, the numeral 50 indicates a vibratory sluice adapted for handling placer sands and gravels, in order to capture the precious or non-precious metals, precious stones, minerals, and the like. Suitably disposed below the bottom of the sluice is a plurality of electromagnetic elements 51 with brackets 52, the latter being rigidly connected with the bottom of the sluice body. The sluice may be mounted on vibrators 53, or other suitable supports, so that the magnets, which in this example act in the direction of the double-pointed arrow 54, when energized, shall cause the sluice to vibrate back and forth, and at the same time, up and down.

The axes of the electromagnetic motivating elements 51, in their horizontal projections, may ordinarily lie in a longitudinally vertical plane of the sluice, but frequently it is desirable to introduce one or more transverse components into the motion of the sluice. In such cases, the axes of one or more of the motivating elements, may be placed in such relation to the longitudinal axes of the sluice that the axes of the motivating elements shall form suitable angles therewith in their horizontal projections, as indicated for example, at 51—1 in Fig. 1. By thus varying the line of application of the motivating power, it is possible to introduce factors into the motion of the sluice, which shall cause solid particles transported through the medium to follow various spiral or other irregular paths occupying a space of three dimensions. The value of this feature can be estimated, when it is realized that by this means, solid particles can be kept in circulation through the medium for prolonged periods of time. This feature is of value where the amalgamation or dissolving of certain solid particles depends on certain considerations of time contacts.

On its interior, the sluice 50 may be provided with precious-metal saving elements of various kinds. Among such elements, riffles of one form or another, constitute important type although under-currents, amalgam plates, mercury traps and so on, are not to be overlooked. In the present instance, the precious-metal saving elements consist largely of so-called riffle pans arranged in groups 56, in each of which the individual riffle pans are placed in cascading relation to one another.

The riffle pan groups are so disposed that the proper fractional part of the material fed to the sluice, reaches and is distributed over, each group in the proper proportions, as shown Figures 1 and 2. Each individual riffle pan may consist of a plurality of riffles spaced apart from one another, and associated in various ways, as indicated for example, at 73 in Fig. 38, where the single riffles are represented at 74. Other arrangements of the individual riffle pans are indicated at 84 and 85 in Figs. 34 and 35.

When the sluice is in operation, it contains water or other liquid having approximately the level indicated at 57 in Fig. 2. The material to be treated, is deposited in the hopper 58, and falls upon a plate 59, which latter may be perforated at 59—1, Fig. 34. From the plate 59, Fig. 2, the material is fed forward over grizzly bars 60, Fig. 1, these being suitably spaced apart from one another. In the present instance the grizzly bars in Fig. 1, for convenience, are shown partially broken away in order to reveal the structure underneath, it being understood, however, that the bars are continuous from the point 61 to the point 62.

Underneath the grizzly bars is a plate 63 which in plan is progressively stepped as desired, in this instance as indicated at 64, 65 and 67, thus forming consecutive spaces which increase progressively in width. This arrangement allows the first quarter of oncoming material to fall into the space 64, and to be deposited on, and distributed over the first group of riffle pans 56. The second quarter of the material drops onto the second group of riffle pans, the third portion onto the third group, and the last quarter on to the fourth group.

The material which is worked down over these four groups of riffle pans finally meets, and passes underneath a fifth group of riffle pans, into the space 69. The material which has passed over the riffle pans 56 will, of course, be small enough to have passed between the grizzly bars 60. In the meantime, the coarser material which slides over the tops thereof, is at the same time thoroughly washed by the agitation of the water above the grizzly bars, and is finally discharged over the edge 62. After passing over the last group of riffle pans, this coarser material merges in the space 69 with the finer material that in the meantime has passed over and has been discarded by the various riffle pans in groups 56. From the space 69, the discarded and recombined material, due to the vibratory force, as hereinafter explained, is transported through the portion 70 of the sluice, finally emerging from the level 57 of the water body, before being discharged from the mouth 71 at the extreme end of the sluice.

The area of the bottom 70, of the sluice in Fig. 2, which lies between the point where the bottom is intersected by the surface 57 of the medium, and the mouth 71, may be termed a "de-watering" area. This area may be made of any desired extent that in individual cases may be necessary. To assist in de-watering, riffles 55 may be located at strategic points in the de-watering area.

The valuable portions of the materials fed through the hopper 58, are caught and retained by the various riffle pans, while substantially only the gangue or waste matter, which has been discarded by passage over the riffle pans, is discharged at the mouth 71, as waste. Any valuable portions that may be so fine as to float on the surface of the water, for instance, float gold, may be finally caught by an appliance such as a floating amalgam plate 72, or later recovered from the liquid medium, which is conserved.

A more detailed representation of a group of cascading riffle pans is shown in Figs. 34 and 35. In these figures, the sluice 50, water level 57, grizzly bars 60, plate 63, and so on, correspond to the various structural members in the sluice, shown in Figs. 1 and 2, but the individual riffle pans 73, 84 and 85, are of various kinds for different specific purposes.

The riffles themselves may be, and in many cases are, preferably of an undercut type, after the manner indicated at 74, and are directed, so as to modify the effect of $V_t$. Fig. 35 shows an arrangement of riffles associated together in pans. Fig. 38 also shows riffle pans, but here they are associated with a deflecting plate 76 by means of which the force $V_t$ is still further modified.

Modified influences exercised by the various elements upon $V_t$ may be clearly visualized from a careful inspection of Fig. 38. One important office of the undercut riffles is to assist in bringing about a condition where all the solid particles are held largely in suspension during the time that the heavier particles require to work their way down through the mass and while the lighter particles are worked clear of the heavier particles. Minor deflecting elements are shown at 75 and 77, and some of the modified current effects in the medium, at 78, 79, 80 and 81.

The greater part of the values are caught and retained in the riffle pans, but small portions may inadvertently escape these pans, so it is advisable to place a "scavenger" pan at a point near the end of the sluice, such a one being located at 82, Figs. 36 and 37. The scavenger pan may have riffles 83, and be located as embraced by the broken line 36 in Fig. 1.

Reverting now, to the subject of dredgers, it may be stated that gold dredgers are usually self-contained units with which mining and recovery processes are carried on simultaneously. Ordinarily, dredgers consist of so-called "digging ladders" having digging buckets, which are adapted to deliver the materials dug, at a point some thirty to forty feet above the deck of the dredger, where it is dumped into a system of gravity sluices or gold saving tables, from which the worthless refuse is discharged into a tailings stacker.

By means of this invention, the entire dredger appurtenances can be so simplified, and the super-structure so reduced, that a large saving in initial cost, results. In the operation of a dredger, pumping costs are greatly reduced by means of this invention, and because of the better operative conditions, that is to say, the elimination of packing of black sand in the riffles, more efficient gold saving is brought about.

Figs. 39 and 40 show a dredger construction which is of the rigid type adapted for the practice of the present process. A sluice, 50—1, using the present process, may be of the general type shown in Figs. 1 and 2, being supported on a bridge made up of trusses 254, and having a pontoon 255 and a hull 258. The upper tumbler shaft of digging ladder 251 need be only high enough above the deck to cause the elevator buckets to discharge into a feed apron 259 which leads into the sluice 50—1. The sluice can be horizontal or inclined upwardly (inclined position not shown), which latter is an advantage in stacking. At 252 is a bow gantry, and at 253 a hoisting cable leading to the lower end of the digging ladder. At 258 is a stern gantry from which a tailings stacker 256 is guyed by means of a cable 257. In this type of dredger, guys 260 connect the pontoon to the hull.

In Figs. 41 and 42 is shown a dredger of what may be called the "flexible" type, having a pontoon 264, a bridge formed of trusses 262 and a hull 261. A king pin 263, allows a certain amount of swinging or oscillation between the hull and the pontoon. This dredger also carries a sluice 50—2, which receives material from a feed apron 267, upon which the elevator of a digging ladder 266 having a tumbler shaft 265, discharges.

The numeral 90 in Fig. 3, denotes a sluice of somewhat different construction than one just previously described, in that it is especially adapted for the separation of minerals containing precious stones or tin. The raw material is fed into a hopper 91 and drops directly into a medium 92. The vibrations cause the material to be transported forward through the medium, and during its travel, the precious stones or the tin drop into the various pockets 93, 94, and 95, the rejected material or tailings being carried along the bottom 96 until finally discharged at the mouth 97. This sluice has the electromagnetic elements 98 and 101, and the vibrators 99 and 102.

By using the present process to apply paint, lacquer, or other coatings to articles of many different kinds, a continuous series of operations may be performed consecutively. Such operations may include passing the articles through an acid bath, through a washing bath, and then drying the articles before applying the coating, all these operations being automatically performed without manual handling of the articles.

In connection with washing or painting operations, it may be noted that peculiar and beneficial effects are obtained by means of forces developed in a medium due to the present process. Among these effects may be mentioned the intense rubbing or brushing which may take place between the medium and a solid, thereby eliminating air bubbles while the medium is brought into intimate contact with the surface or surfaces to be painted. This property is especially valuable where extremely uniform coverings are required.

In laundering, the initial washing may take place in one compartment of a container, the clothes being then transported through another compartment where the moisture is extracted by means of the same vibratory force that causes the $V_r$ to be developed in a medium. The extraction of the moisture is due to the rapidity with which the clothes follow a serrated path through the air, thereby shaking the moisture out of the clothes. Afterwards, the clothes may be transported into a third compartment containing clean water for rinsing, and thence into a fourth compartment where the moisture is extracted from the clothes before being discharged. In all these operations, an extremely efficient agitation in the washing medium may be set up, and the apparatus can be so nicely adjusted to the particular object in view, that a notable improvement in results may be attained. In this process, localized violent agitation of the medium is brought into immediate contact with the clothes without causing any injury to the fabrics, such as frequently results from a rubbing contact with wood, metal or other surfaces.

The nature of the force $V_r$ developed in a washing medium can be so regulated that the loosened particles of dirt, as well as soap or other washing compounds incidental to washing operations, shall be segregated in or on certain portions of the medium, ready to be skimmed or drained off while the medium itself is thereby clarified.

In washing dishes, detached food and grease particles can likewise be segregated within the medium, and then be skimmed off in one mass for incineration or transported thru the medium and de-watered. By eliminating food and grease particles from dish water, the clogging and stoppage of drains may be largely averted.

The container 110 in Fig. 4 in which various washing operations may be carried on, has suitably disposed along the inner surface of its side walls, a track 112. On this track, baskets 113 or other suitable receptacles may be provided with hangers 114 to carry shoes 115 at their upper ends, the latter being adapted to ride along the rails 112, as shown more in detail in Figs. 14 and 15. These baskets may have the perforated or screen side walls 116, and end walls 117, and in many cases also have the screen bottom 118, and screen top 119. In other cases a basket 109 may be provided with a top consisting of a heavy plate 119—1, Fig. 17, made of glass, metal or other suitable material, in order to suppress the force $V_r$. If desired, deflectors 100 may be provided to direct $V_r$ inwardly of the baskets 113, as indicated in Fig. 15A, at 100.

The washing process and the apparatus for carrying it out, as here disclosed, form the basis of my co-pending divisional application for U. S. patent, Serial No. 166,191, filed September 28, 1937.

The container 120 in Figs. 5 and 6, may confine an inelastic medium 121, and on top of the inelastic medium may float an elastic medium 124 having a specific gravity less than that of the inelastic medium 121. The effect of, and upon, the superimposed body of the lighter, elastic medium, is described hereinafter.

In Figs. 7 and 8 is shown a suitable container 125 in which a process of flotation may be carried on. To this end, the container 125 may confine a mass of flotation pulp 126, with which one or more suitable frothing agents, when subjected to the developed force $V_r$, will produce a copious froth in a zone such as 127.

In this instance, the motive units, instead of being symmetrically disposed with regard to the axis of motion of the sluice, may be placed largely to one side of the axis, as at 131, 132 and 133, so as to exert a transverse motion-effect with regard to the said longitudinal axis. By thus introducing a force component effective to produce motion unsymmetrically and transversely in a horizontal plane, a uniquely modified separation between different materials may be made. It will be noted in Figs. 7 and 8, that the motive units may be placed in acute angular relation to the container with regard to the axes of the motive unit and the horizontal plane of the container. The flotation tailings move in the general direction of the arrow 134, while the bubbled froth containing the mineral values travels toward a weir or other discharge arrangement approximately in the direction of the arrow 135. Thus the values can be diverted through an opening 145 into one of the launders 128. A baffle may be provided at a point such as 146, to prevent froth from being carried away with the tailings.

The aeration process and machine, here disclosed, provide, in part, the basis for my co-pending application for U. S. Patent, Serial No. 166,192, filed September 28, 1937.

In Fig. 9 is shown the fragmentary portion of a container 136 which confines a liquid medium 137. In the bottom of the container may be disposed a ramp member 138, which separates the medium into separate portions, one of which is indicated at 139.

Extending longitudinally along container 136 may be disposed a pair of rails 140, Fig. 12, and adapted to ride on these rails may be a cage or cylinder 141, having walls of screen mesh fabric provided with tire bands 142 which may travel along on the rails 140, due to the vibrations imparted to the container. Through these vibrations at the same time is developed the force $V_t$ which then becomes effective to thoroughly agitate the medium 137, portions of which pervade the inside of the cylinder 141 through the meshes of the screen, and percolate thoroughly through any material or objects which may be contained in the cylinder, it being understood that the cylinder has a door (not shown), or other device by means of which the inside thereof can be reached.

If the apparatus is used for washing clothes, it will become obvious as soon as the nature of the force $V_t$ is explained, that the various garments or other items of clothes that may be contained in the cylinder, will be subjected to a washing of any desired intensity. On the other hand, if this washing apparatus is to be used in certain industrial operations, the medium 137 might consist of an acid bath, while the medium 139 might consist of paint, and the cylinders 141 might represent any objects to be subjected to the acid bath, these objects being next dried while passing over the ramp 138, and finally conveyed through a paint bath in the form of a medium 139.

In Fig. 10, a container 160 is shown, in the lower portion of which may be confined a liquid medium 161, while another liquid medium 162 is superimposed thereupon. This condition may occur when two liquids having different specific gravities, but both having relatively inelastic properties are placed together in the same container.

Fig. 11, illustrates a sluice 150 which can be divided into a number of different compartments, in this instance two, which contain respectively the mediums 151 and 152, the mediums being separated from one another by an elevated portion 153—1 having the ramps 153 and 153—2. Objects 154 to 157 are shown in the act of traveling through the sluice, and being exposed to different mediums successively. The action accomplished by the apparatus shown in Fig. 11 may be somewhat different from that accomplished by the apparatus shown in Fig. 9, because Fig. 11 indicates individual objects being moved directly through a medium, while Fig. 9 indicates cages in which smaller individual objects are confined.

In Figs. 18 to 21 are illustrated some of the motion effects observed during the actual operation of this process, it being assumed that the sluice 199, or container, is being vibrated along a line such as is represented by the double-pointed arrow 202. The dotted line 198 indicates the lowermost position reached by the sluice. When the motive power input is small, the effect upon the medium is to cause its surface to assume a wavy or rippled pattern, somewhat after the manner indicated at 200 in Fig. 18. Near an end wall of the container, which in this case is slightly sloping, there is sufficient concentration of the force $V_t$ to overcome the surface tension of the medium and a slight spouting action takes place, as indicated at 201. As the motive power increases, the lines in which the force $V_t$ is manifested, break through the tensioned surface of the medium, with the result that innumerable jets of the medium are projected upwardly from the surface of the medium to produce a spouting action. The intensity of the spouting action increases as the power input is increased, and can be made to assume almost any degree of vigor, and even violence, desired. The result of such an action, if not interfered with by obstructing elements or other modifying means, asserts itself along substantially vertical lines.

In Fig. 20 is represented the effect of a vigorous side spouting resulting from the action of the lines of force $V_t$ when locally modified by the curved undercut surface 214 of riffle 213, the latter being fastened to the bottom 210 of the sluice. The obstructing effect of this riffle is manifested by the deflection of the lines of force in front of its under-cut face, which results in the spouting at 215 and formation of a spray.

In Fig. 21 the action is somewhat similar to that indicated in Fig. 20, but the undercut face 217 of the riffle 216, is straight, so that the effect upon the resulting spray 219, is to elevate the latter instead of tending to depress it, as is the case at 215 in Fig. 20.

In Fig. 20 a ball 245 is shown, near a riffle 246, which ball, because of the peculiar action developed in the medium and/or the travel of the sluice, revolves, assisting in the disintegration of materials, such as clays and the like.

Both Figs. 20 and 21 show the effects that may be achieved by means of the present invention, when efficient scrambling, mixing, or washing actions in localized portions of the medium are desired. Such effects can readily be obtained by causing the normal lines of force $V_t$, as at 212 in Fig. 20, to cut transversely into or across the modified lines of force which produce the spray at 215. A similar effect, but in a slightly different degree, is represented in Fig. 21, where the normal lines of force $V_t$ at 218, cut into and across the modified lines of force producing the spray at 219.

Still other ways in which the force $V_t$ can be manipulated to produce localized force effects, may be noted by referring to Fig. 43, where a main container 310 confining a medium 315 is shown in conjunction with two smaller containers 317 and 320, the latter being afloat on the medium 315. In these containers there are confined respectively, the mediums 319 and 322. It is assumed that the container 317, having a relatively thin bottom 318, is made of elastic or flexible material such as rubber or sheet metal, while the container 320 having a relatively thick bottom 321, is made of non-flexible or non-elastic material, preferably glass or the like.

When the lines of force $V_t$ are induced or developed in the medium of the main container, the normal effect of these lines of force produces a certain spouting effect which results from the action of the lines of force represented at 315. Simultaneously, within the container 317 it is found that the lines of force $V_t$ at 319, are somewhat less in their intensity than are the lines at 314, which latter produce the former. Thus, the effect of the flexible bottom 318 is to weaken the intensity of the normal lines of force $V_f$ which may exist in the container 310. The extent of this weakening effect is increased relatively, as the elasticity of the bottom 318 is decreased. On the other hand, considering the container 320, it is found that the lines of force $V_f$ indicated at 316, owing to the inelasticity of the bottom wall 321, are substantially nullified. Therefore, the lines of force at 316 exert no perceptible effect at all, upon the medium 322. In practice, it is noted that the lines of force $V_f$ below 321 are not annihilated, but are bent aside, and are caused to exert their effect around the container 321, very much as indicated in the drawings.

In Fig. 16, the sluice 220 may have fixed within it, a longitudinally extending channel member 226 having flanges 221, above which may be disposed two inclined, longitudinally extending bars 224. The three members 224 and 226 may be of uniform thickness or the thickness may taper from maximum to minimum an example of the tapered construction being indicated at 389 in Fig. 48. By this means the effect of $V_f$ between the riffle pan 227 and the channel 226, and extending longitudinally through the sluice, may be graduated from substantially nothing to any certain desired maximum in accordance with the explanation just given with regard to the varying effects made possible by the use of modifying elements having different elastic properties. Thus in the case of channel 226 and bars 224 the maximum modified effect of $V_f$ would take place above the thin ends of the members and the least modified effect of $V_f$ above the thick ends thereof.

The operative effect of the vibratory motion in developing the force $V_f$ is described hereinafter with particular reference to Figures 18 to 21, 22 to 33 and 43, and with incidental references to the various figures showing apparatus in which the invention is reduced to practice.

The theory involved in applying this invention to the separation of material particles of different classifications, from one another, is best explained by means of the diagrams appearing in Figs. 22 to 33. In these diagrams, Fig. 22 represents the relative positions of a sluice at the two extremes of a stroke, and one position intermediate the two extremes.

In order to have a numerical basis for reference in this discussion, the length "R" of the stroke in the diagram is assumed as being about 0.070 of an inch. In the present example it is also assumed that an alternating electric current having a frequency of 60 cycles is used to energize the electromagnet. This means that there are 120 reciprocations of the sluice in one second. To show what effect the rapid reciprocation of the sluice exercises upon the medium and the various material particles contained therein, one cycle of two strokes will be studied.

In studying the cyclic motion it may be assumed that the sluice 300 starts in each cycle from the upper extreme position in Fig. 22, and descends successively to the intermediate and lower extreme positions 300—1 and 300—2, respectively. From the lower extreme position, the travel is suddenly reversed, and so the sluice ascends in its return stroke, to successively the intermediate position and the upper extreme position. Thus, in these diagrams, each cycle is represented by the three positions of the sluice indicated in Fig. 22, and the five positions indicated in Figs. 23 to 27. Fig. 23 represents the upper extreme position, Fig. 24 the intermediate position in descending, Fig. 25 the lower extreme position, Fig. 26 the intermediate position in ascending, and Fig. 27 the return to the upper extreme or starting position.

For convenience, the bottom of the sluice in Figs. 23, 24, and 25, is shown at the same level, but as a matter of fact, in order to correspond to the diagram in Fig. 22 the horizontal axis Y—Y in each of the Figs. 23 to 27, represents actually that same level. Since the sluice in this example, moves through 60 cycles of motion in one second, it will require approximately 0.008 of a second for one stroke. It will be noted that as the sluice travels through its descending stroke, a certain amount of energy is stored in each minute mass or droplet of the medium, because of such descent. As before stated, the descent of the medium is suddenly interrupted when the travel of the sluice is reversed to begin the upward stroke, thus arresting the downward movement of each droplet of the medium. This tends to store in each droplet a certain amount of energy the summation of which, is expressed by the symbol "$V_f$".

In the descent of the sluice, faster than the medium would fall due to gravity alone as hereinbefore explained, there is a tendency to create a vacuum between the medium and the sluice surface upon which the medium rests, thus changing and further unbalancing the relative difference of restraint of the forces acting on the upper and lower surfaces of the medium.

In other words, the resultant of all the energy stored or tending to be stored in the various droplets of the liquid, tends to exert itself equally in all directions if it is free to do so. If, however, this energy is not free to exert itself equally in all directions, it will follow the path of least resistance, which in the case of the sluice under consideration, is substantially straight up, because the resistance of the air to the expression of the force, is considerably less than is the resistance of the sides, ends and bottom of the sluice.

An example of actual practice taken from a sluice driven mechanically, serves to define the force designated herein as $V_f$. In this example:

Stroke of sluices equals $\frac{1}{16}$ inch.

Angle the line of travel of sluice makes with the horizontal, equals 30 degrees.

R. P. M. of eccentric shaft equals 2400.

The vertical descent of the sluice equals $\frac{1}{16}$ in. x sine 30 degrees, equals 0.013 ft.

The vertical distance through which the medium would fall if acted upon only by gravity, equals $\frac{1}{2}gt^2$ where "$g$" (gravity) equals 32.2 and "T" represents time in seconds.

Since 2400 R. P. M. of the eccentric shaft gives 2400 down-strokes to the sluice, occupying a total of 30 seconds, each down-stroke occupies $\frac{1}{80}$ second. Therefore, $\frac{1}{2}gt^2$ equals $\frac{1}{2} \times 30.2 \times (\frac{1}{80})^2$, which in turn equals 0.0025 ft.

Therefore, since it is not likely that a vacuum will ever be formed between the medium and the surface upon which it rests, it follows that the medium in the sluice, in the given example, due to the atmospheric pressure upon its surface, must descend approximately five times (0.013 divided by 0.0025) faster in an equal period of time than it would descend if subject only to gravity.

Artificial atmospheres may be created on all or any part or parts of the surface of the vibrating medium or mediums, if it is necessary or desirable at any time to vary the natural atmospheric pressures. Such exigencies might occur in different special cases of separating certain materials or in particular requirements of many industrial processes.

In Figs. 44 and 45, are illustrated devices by means of which such variations in fluid pressures bearing on the surface of a medium may be brought about. In these figures is shown an inverted, open-mouthed, but otherwise closed, vessel or hood 340 with the lower portions of its walls submerged in the medium. Here, the level 341 of the medium within the hood is higher than the level 342 of the medium outside the hood, indicating that the fluid pressure at 343 within the hood, is less than atmospheric pressure. Another hood is shown at 344 with a portion of its walls submerged in the medium, but in this case, the level 345 of the medium within the hood, is lower than the level 342, which indicates that the fluid pressure at 346 within this hood is greater than atmospheric pressure.

Pipes 347 and 348 leading into the hoods 340 and 344, respectively, may be connected with any suitable source or sources (not shown) of fluid or fluids under pressure, and be provided with suitable valves (not shown) operative to vary or regulate the fluid pressures within the hoods as required, either during the time the medium is in motion or at any other time. In other words, the artificial fluid pressures may be constant during any given periods of operation or they may fluctuate in any desired or required manner during such periods of operation.

The variable pressure apparatus here disclosed, forms the basis of my co-pending divisional application for U. S. patent, Serial No. 166,193, filed September 28, 1937.

The exact speed of the up-and-down reciprocations resulting in the development of the force $V_t$, is not fixed for all purposes, but varies with different mediums and with different substances passing through the mediums. Experiments show that it must be at least so fast that the medium descends through a down-stroke faster than would be its fall through the same down-stroke due to gravity alone. This means that the ratio between the rate at which any medium is falling, and $\frac{1}{2}gt^2$, must be at least greater than unity in order that the force $V_t$ may be of practical value. The greater the speed of the medium through a down-stroke with respect to $\frac{1}{2}gt^2$, the greater will be the intensity of the force $V_t$ thereby developed.

The net effect of the above described manifested force within the medium is readily indicated during the operation of the sluice, by the spouting of the medium, or the tendency to spout or to produce a wave action which shows itself on the surface of the medium. It is also very apparent whenever a body foreign to the medium is placed in the same, because a further local unbalancing or relative difference in restraining action upon the forces, takes place. The lines of force set up in the medium may be likened to the lines of force which constitute a magnetic field, and from experiments to date it is evident that these lines of force in the medium, offer resistance to deformation or change in their path, this being analogous to the resistance to cutting offered by lines of force in a magnetic field.

In general, these lines of force, $V_t$, materially affect the relative buoyancy nearly, but not entirely, in proportion to the effective mass of any particular particle.

As a further explanation of $V_t$, it may be said to represent the manifestation of the force stored, or tending to be stored in the medium, and that this manifestation results from the action of such force in any local portion of the particular medium under consideration or on any particle or group of particles foreign to the medium wholly in, and/or partially in, and/or upon the medium.

It may be well to explain that the energy tending to be stored is due to the frequent arrest of the momentum developed in each droplet of the medium during its descent. The net result of the energy available which is tending to be stored, is manifested in a direct line from the droplet along the path of least resistance, regardless of the slope or position of the container.

If any obstruction is placed in the medium so as to intercept any of the $V_t$ lines of force, then such lines of force will be bent or deflected from the vertical in strict accordance with the nature and relative position of the surface or surfaces of such obstruction, and the local expression of $V_t$ will therefore be changed and be other than generally vertical.

If a group of droplets of a substance foreign to the medium, said substance having elastic properties and being of such mass effect that $V_t$ tends to hold them in suspension, or when the specific gravities of the foreign droplets are such that the mass of the medium, in effect, is the greater, and they tend to or do float on the surface of the medium, as indicated, for example, in Figs. 6 and 10, or when the droplets remain in suspension within the medium, then it is evident that because of their relative elastic properties, the foreign droplets will absorb some of the lines of force which are transmitted through each droplet of the inelastic medium to a droplet of the foreign substance adjacent the said droplet of the medium.

The droplets of the medium being relatively inelastic and confined, the summation of the various lines of force which they transmit, can manifest itself in the deformation of all the relatively elastic bodies made up of the elastic droplets. This deformation of the relatively elastic bodies tends to cause a movement of the bodies, and this movement of the relatively elastic bodies and the absorption of the force transmitted to them will, unless restrained, result in the collection or grouping of all such relatively elastic bodies. Because of the relatively elastic properties of each foreign droplet, and because of the fact that the forces alternate as previously indicated, the result will be a movement of each relatively elastic droplet toward another until the summation of the elastic properties of the group of elastic droplets is sufficient to counterbalance the force transmitted by the relatively inelastic particles between it and the container. See Figs. 5 and 6.

The term "mass effect" as used herein, is a convenience for designating the net result of the action of the force of gravity upon a particle modified by the various characteristics of the particle, such as its mass, character of its surface, the viscous properties of the medium, effect of impact with other particles, and so on. Since every mass effect has its own particular magnitude, another term "mass value" may be used to designate such magnitude. For the purpose of this specification, the terms "mass effect" and "mass value" may be regarded as sometimes synonymous.

The various particles of matter passing through the medium can be grouped into four classifications for the purposes of the present discussion. Matter grouped in one of such classifications may be called "$P_a$" (not indicated). This term denotes such particles of matter where the mass effect, even when modified by $V_f$ is so great that they tend to descend at a greater rate than the rate of descent of the sluice on its backward and downward stroke. The mass effect so developed and modified by $V_f$ for particles of this class, is sufficient to develop the requisite friction between the particle and the bed of the sluice or the particle immediately supporting same, that the particle will remain in position, and cut, bend and/or deform the lines of force developed in its path.

In the latter case, since the friction is great enough to cause the action mentioned on the downward movement, it is evident that it would also be great enough to cause a similar action on the forward and upward movement. Therefore, such a particle tends to remain, or does remain, in the same position in the sluice with reference to the point E (Figs. 23 to 27) unless it is acted upon by particles of the other three classifications. It has been shown by experiment that the particles in the other three classifications tend to and do force the particle $P_a$ to move forward.

In Figs. 23 to 27, the three particles A, B and C represent the three other classifications. The larger particle A in these figures, represents a class of particles whose mass effect when modified by $V_f$ tends to fall through the medium with a velocity greater than the velocity of the sluice in the direction of its vertical component, during the descending portion of the cycle.

In this class the result of the mass effect of the particle A modified by $V_f$ together with the downward movement of its support 300 is such that the friction developed between particle A and its support 300 is not sufficient to cause any appreciable bending or cutting of the lines of force $V_f$, immediately surrounding the particles. In the instance of particle A the mass effect modified by $V_f$ together with the effect of upward movement of the sluice, develops sufficient friction between the sluice and the particle during the upward portion of the cycle, to bend or cut through the lines of force immediately surrounding the particle A in question.

The operative result of the conditions just set forth, is that during the downward and backward movement of the sluice, the particle A remains fixed with respect to the vertical reference axis X—X, but does not remain fixed with respect to any definite point such as E of the sluice, while during the forward and upward movement of the sluice, the particle A moves with respect to the vertical reference axis X—X, but remains relatively fixed, except as modified by contact with other particles, with respect to the point E, the actual result being a forward movement of the particle A with respect to the sluice.

This means that when the sluice moves from the position shown in Fig. 23, to the position in Fig. 24, and then to the position in Fig. 25, that the particle A is not moved with respect to the axis X—X, but in moving from the position indicated in Fig. 25 to the position indicated on Fig. 26, that particle A will have moved forward with respect to the axis X—X, and again when the sluice moves from the position indicated in Fig. 26 to the position indicated in Fig. 27, that the particle A will have moved an additional distance with respect to axis X—X.

Thus in one cycle, the particle A will have moved with respect to axis X—X, from the position indicated in Fig. 23 to the position indicated in Fig. 27, and this movement will of course be repeated in each succeeding cycle if the general conditions remain the same.

The particle B, shown in Figs. 23 to 27, may for the purpose of this discussion, be supposed to be one of relatively greater mass effect than the particle indicated at C.

In Fig. 23, E indicates the fixed point where the vertical axis of reference X—X intersects the bottom surface of the sluice at the crest of a cycle, and for convenience we may designate the time at this fixed point as "0-hour" and refer this time to the vertical axis X—X. Then at 0-hour plus 0.004 of a second, the sluice will have descended below the horizontal axis Y—Y the vertical distance shown in Fig. 24, while the point E in the identical period of time, will have moved backward with reference to the vertical axis, the horizontal distance shown. These distances in actual magnitudes depend upon the magnitude of the angle that the line of action 325, Fig. 22, of the external force applied to the sluice, makes with the horizontal, and upon the magnitude of the travel. This angle and the magnitude of travel "R" may vary quite considerably but for the purpose of this illustration, an angle of 20 degrees is used, and a travel "R" of approximately 0.070 inch. During the backward and downward movement of the sluice, the particles B and C, because of their mass effect, and as modified by $V_f$, descend in a general vertical direction, there being not any friction developed between them and the sluice to bend or cut the lines of force in the immediate vicinity of the particle. Since the mass effect of the particle B has been assumed to be greater than the mass effect of the particle C, the distance that the particle B will have traveled in the corresponding increment of time will be a distance greater than that traveled by the particle C.

The particle A because of the insufficient friction between it and its support is not able to bend, or pass through, the lines of force represented by $V_f$, and therefore it will have descended vertically, that is to say, parallel to vertical axis X—X. At 0-hour plus 0.008 of a second, the sluice will have reached the lowest point of its cycle, and the point E will have traveled the maximum distance backward. During this interval of time, the two particles B and C will have descended to the points indicated in Fig. 25, while the particle B being of greater mass effect, will have fallen through the medium faster than the particle C which is of less mass effect, but each of the three particles is still in the same position with reference to the vertical axis X—X.

At 0-hour plus 0.008 of a second plus an increment of time, the sluice will have been started on its upward and forward movement so that the friction between particle A and the sluice becomes great enough to cause the particle A during the upward and forward movement of the sluice to cut the lines of the force $V_f$, and so it rides forward and upward with the sluice.

At 0-hour plus 0.012 of a second, the plane of the sluice will have reached the position indicated in Fig. 26. In the meantime, the particle A will have traveled forward substantially the same distance that the sluice will have traveled forward since the beginning of the upward and forward stroke of the sluice, due to the fact that at the lowermost point of the cycle, the inner bottom surface of the sluice will have intercepted its descent and will have changed the frictional adhesion between particle A and its support.

Next, the sluice will here come in contact with and interfere with the descent of particle B, and so will also be carried forward by the sluice, because its mass effect is sufficient to build up the requisite friction to cause it to move forward across the various lines of force.

The particle C is intercepted a little later by the forward and upward movement of the sluice, and it is then carried forward similarly to particle B.

At 0-hour plus 0.016 of a second, as indicated in Fig. 27, the sluice will have completed one cycle of its operation, and will have carried forward the particles A, B and C to the relative positions indicated. The point E located on the vertical line of axis X—X at the crest of the cycle and being the point at which all three particles were in contact with the inner bottom surface of the sluice at the beginning of the cycle, has now returned to its original position on the vertical reference axis X—X, and all the particles have moved forward in accordance with their relative mass effects modified by the force Vr and the other factors hereinbefore mentioned.

At this point it is well to note that as the material particles move forward through the medium, they tend to segregate themselves according to their mass effect modified by Vr. If in their forward movement the particles are brought into contact with certain obstructions lying in their path of travel and which arrest their normal movement, these particles having greater mass value when acted upon by Vr will, when in front of such obstruction or during their travel, tend to displace particles of lesser mass value.

The "boring" or "digging in" of the heavier particles, and the crowding out thereby of the lighter particles, is illustrated in Figs. 28, 29, and 30, this being observed in the actual operation of the present process. In Fig. 29 three particles are shown, one of relatively high specific gravity or mass value, and two of a lesser specific gravity or lesser mass value. These might even be taken to be the same three particles A, B and C acting under different conditions from the conditions indicated in the previous figures.

At the moment ending the upward and forward stroke of the sluice, that is to say, at 0-hour plus 0.016 of a second minus a differential increment of time, the forces acting upon the three particles are the mass effect of each of them modified by Vr, with the further modification due to the position of the particles and the upward and forward movement of the sluice, all of which modify the mass effect.

Fig. 28 illustrates the conditions at the 0-hour plus 0.016 of a second. At this instant a cycle of motion has been completed and another started, so mass effect acting upon such particle is modified by Vr and their relative positions. The net force acting to separate the three particles is different however since the mass effect of the heavier particle A—I at this instant has a tendency to cause it to fall and descend at a greater rate than the two lighter particles, and this relative mass effect is being modified by the forces Vr together with a force resulting from the position of the particle which tends to make a greater differential between it and the two lighter particles than would ordinarily be caused, due to their relative specific gravities and/or their relative masses when not modified.

At 0-hour plus 0.016 of a second plus an increment of time, the sluice is receding with respect to the three particles, as indicated by the arrow 326 in Fig. 30. Supposing now that the support 300—3 has been removed the three particles are then descending through the medium, each according to its mass effect modified by the force Vr and the forces resulting from their position at 0-hour plus 0.016 of a second.

The vertical paths along which particles of different physical characteristics are caused to travel by means of the force induced in the medium, are illustrated in Figs. 31, 32 and 33.

In Fig. 31 is shown the path traversed by the particle C, this particle being of low specific gravity, where the time of contact pressure between the particle and the sluice plane is not very great, the advance of the particle in the direction of transportation, is rather small, as indicated by the inclined portion 330 of the path. The vertical portion 331 of the path is also rather small because of the slower settling of the particle in the medium, during each cycle.

In Fig. 32, the inclined portions 332 of the path followed by particle B indicates an increase in the contact pressure between particle B and the sluice plane, so that the relative advance in the direction of transportation, is greater than that of particle C, while the vertical portion 333 of this path indicates the more rapid settling property of the particle B over that of particle C.

In Fig. 33, the path represented is that of particle A. Here the increase in the time of contact pressure between the particle and the sluice on the upward and forward stroke, is greater than it is in the case of particles B or C and practically one-half the cycle. Therefore the advance of the particle in each cycle will be substantially equal to the stroke of the sluice, this being represented by the inclined lines 334 while the vertical lines 335 indicate a very rapid rate of settling.

From the foregoing, it will be clear that when material particles are placed in the medium, these material particles are elevated in various degrees depending upon the time of their contact pressure upon the supporting plane of the sluice and on the sudden withdrawal of the support of this plane at the highest point of forward travel of the particles, whereby the particles are allowed to descend through the medium against its natural buoyancy combined with the upwardly directed force of the droplets of the medium, due to the sudden reversals in fall of the liquid as previously stated.

While the ideal condition for operation of my process occurs where the water or other liquid is conserved to a maximum degree, yet where there is an abundance of water, or where the material that is treated, is accompanied by a certain amount of water, this too can be advantageously handled by means of my process. In such a case a confined or segregated body of water is still maintained, while the excess water which may accompany the material, enters the segregated body and a substantially equivalent amount is allowed to overflow or be discharged, without in any way interfering with the principles upon which the practice of this process depends.

It is obvious that the forces brought into action in my process, when developed in the medium, have the tendency to clarify the medium. Where the process is used in placer operations, this tendency to clarify, and/or to maintain the finely divided particles in local suspension, is of particular advantage, since this circumstance renders the presence of many clays and silts in placer material quite unobjectionable.

Typical serrated paths are shown in Figs. 31, 32 and 33. While these figures have hereinbefore been discussed from one viewpoint in connection with the explanation $V_r$, yet the importance of the underlying principles is such, that a fuller discussion thereof at this point seems warranted, as being at the foundation of the separative effects of my process.

Following now, the paths traversed by the three particles hereinbefore referred to as A, B and C it will be observed that the motion of any particle is dependent upon the length of time that it rides with the sluice during the upward stroke of its cycle of motion, and the length of time that the particle occupies in descending through the medium under the influence of gravity between rides with the container.

To begin with, all the particles may be supposed to be riding with the sluice through the upward portion of a cycle of sluice motion. At the end of the upward stroke, the sluice which in its upward travel has been supporting the particles, suddenly drops away and leaves the particles free to descend through the medium under the influence of the force of gravity. At the same time however, the fall of the particles is resisted by the medium, and/or by the effect of repeatedly interfering with the fall of each droplet of the medium. The important thing to observe is that each serration defining the path of a particle, represents a number of different factors influencing its movement. In the first place, each serration is in the shape of approximately a right angle triangle, of which the hypotenuse coincides with the line of action of the motive force as applied to the sluice. The altitude of this triangle represents the path of a particle falling through the medium, due to the action of gravity upon that particle during the interval of time between the points where the sluice drops away from the particle and where it again picks the particle up. The actual length of the altitude is determined by the physical characteristics of the particle because these regulate the velocity of the falling particle. The difference between the time length of a cycle of motion and the falling time determines the length of time that that particle remains in contact with the ascending sluice. As a result, it is clear that each individual particle will have a characteristic serrated path of travel. This may be clearly seen by comparing with one another, the serrated paths represented in the three Figures 31, 32 and 33. Assuming for instance, that hypotenuse 334, Fig. 33, represents in direction and magnitude, one stroke of the sluice traveling in the line of action of the applied motive power, also let this hypotenuse represent the complete upward travel of one special solid particle, then the altitude 335 will represent the length of time that it takes that special particle to drop from the vertex of the triangle to its base, and this will be equal to one-half the time necessary for the sluice to pass through one complete cycle of motion.

This may be clearly seen by comparing with one another the serrated paths represented in the three Figures 31, 32 and 33. These paths have hereinbefore been described in connection with the particles A, B and C respectively.

Each one of these serrated paths is made up of an indefinite number of right triangles, and in tracing out what actually happens to the various particles as they move through the medium, it is convenient to refer to these diagrams.

Assuming that hypotenuse 334, Fig. 33, represents in direction and magnitude one stroke of the sluice traveling the line of action of applied motive power, and also that it represents one complete upward travel stroke of particle A, then the altitude 335 will represent the length of time that it takes the particle A to drop from the vertex of the triangle to its base, and this will be equal to one-half the time necessary for the sluice to pass through one complete cycle of motion.

Since the particle B has a mass value less than the mass value of particle A, it does not fall through the medium as quickly as the particle A. Therefore the altitude 333 of the triangles in Fig. 32 represents the distance that the particle B falls through the medium from the time that the sluice drops away from it at the vertex, until the sluice again intercepts the particle.

The mass value of the particle C is less than particle B so its vertical fall through the medium between the time that the sluice drops away from it at the vertex of the triangle, and again intercepts the particle may be represented by the altitude 331 in Fig. 31.

In each instance of the three particles, the length of the hypotenuse of the corresponding right triangle represents the relative length of the time that a particle is riding with the sluice.

In comparing the transportation characteristics of the three special particles it is to be noted that the length of a hypotenuse plus an altitude in any of the serrated paths of travel equal the actual theoretical distances traversed by the particles whose path they represent, and each of these sums in actual linear magnitude represents the distance traveled by the corresponding particle. That is to say, the hypotenuse 334 plus the altitude 335 equals the distance traversed by particle A in one time cycle in exactly the same time cycle particle B will have traversed in actual linear magnitude the distance 332 plus 333, and finally particle C in that same cyclic period of time will have traversed a linear distance equal to the hyptenuse 330 plus altitude 331.

Looking at this result in another way, the hypotenuse 334 represents the time spent by particle A in its upward ride in contact either with the bottom of the container or with other material upon which it may be resting, while the altitude 335 represents the time in which this same particle is descending through the medium before it is again picked up by its sluice support. During this same period of time particle B will spend that portion of a time cycle in riding on the sluice or other support that is represented by a hypotenuse 332, and then it will spend that portion of a time cycle represented by 333 in descending from the point where it is left by the sluice support until it is again picked up by it, and finally particle C will spend that portion of a time cycle in riding the sluice or sluice support that is represented by the hypotenuse 330, and it will spend that portion of a time cycle in descending between sluice contacts, that is represented by the altitude 331. From this it will be understood that each serration in each of the Figures 31, 32 and 33 represents a complete time cycle, and that any point of time intervals at any of these serrations in Fig.

31 are equal to any serrations in Fig. 32 or Fig. 33, but it will be noticed that the mass effects of the respective particles play a very important part in just what the respective distances of travel in each time cycle shall be.

It will be remembered that for the purpose of present discussion the angle that each hypotenuse 330, 332 and 334 makes with its respective base is 20 degrees so that the included angle at the vertex of each triangle is 70 degrees. By superimposing serrations from each of the Figs. 31, 32 and 33 upon one another so that their vertices and the respective sides coincide with one another the various points of pick-up of the different particles by the sluice can be readily compared.

Various facts concerning the relative movements of the three representative particles may now be ascertained. Among these facts may be mentioned that unless the angle which any hypotenuse makes with its base is greater than zero, that there will be no selective motion which is based upon the principles just enunciated, because there will be no vertical component. Similarly the angle between any hypotenuse and its altitude must be greater than zero in order to have translation. Unless there is translation there will be no transportation, and unless there is a vertical component there can be no selective action based on classification as determined by the characteristic rates of settling of solid particles in a medium in accordance with the principles well understood in the science of ore dressing.

In deciding upon certain desired separation effects, these can be predetermined by varying the force components, and also by varying the density of the medium. Variations in the density of a medium can be obtained by adding any substance which dissolves in the medium, such a salt, or by adding any substance with is held more or less in physical suspension in the medium. Any such substances may be added to the medium at any time and in any suitable way during the motion cycles of the medium or when the medium is at rest, before commencing the motion cycles. For example, when a sluice is running, an operator may determine that a change in density of the medium would be beneficial. In that case, a densifying substance could be added to the medium gradually, and the effects observed, until the desired result is reached.

In any event, changing the density would cause the serrated diagrams in the instance of Figs. 31, 32 and 33, other things being equal, to be varied relative to the particular density of the medium selected. Such predetermination of certain desired effects can also be obtained by applying the various modifying elements as illustrated in Figs. 15A, 16, 17, 20, 21, 38 and 43, as well as by superimposing liquids of various densities or of various relative elasticities upon one another, as illustrated, for instance, in Figs. 5, 6 and 10.

The general direction of transportation of material in the sluices, shown in the present instance, is from left to right, it being understood, of course, that in the case of the sluices shown in Figs. 4, 6, 8, 9, 10 and 11, are supposed to be equipped with vibratory motivator units, similar to those illustrated at 51 in Fig. 2, but which for convenience have been omitted in these figures.

The spouting action, illustrated in Figs. 20 and 21, is the result of interference with some of the lines of force $V_t$ without regard to the direction of transportation, which might at the same time be imposed upon particles passing through a particular sluice. The direction of the spouting might be as shown regardless of whether the particles in the respective sluices are traveling toward the right or toward the left. Such spouting merely adds another effective separating factor to those already mentioned, since the washing of the sprays developed tends to wash objects such as pebbles or boulders free from any adhering clay or silt and locally change their relative buoyancy.

With respect to containers such as 113 in Figs. 4 and 15, which travel on the rails 112, Fig. 4, it may be noted that the transportative effect developed, due to the horizontal component of the motive power, results in pinching the containers along the rails in the same general way that it would cause small particles to be transported through the medium 106 or 107. In the instance of the container shown in Fig. 9, the cylinder 141 would roll along the bottom surface of the sluice, due to the transportative component of the motive force, while the basket 143 would be obviously pinched along the bottom sluice surface.

In the instance of the flotation sluice, illustrated in Figs. 7 and 8, it will readily be seen that the transportative component of any motive force would cause the pulp to be moved from the inlet 129, towards the discharge end of the sluice, and after the values have been abstracted the tailings would continue through and over the discharge end, while at the same time a certain amount of operative liquid to serve as a medium, together with reagents, would be admitted through the pipe 130.

While I prefer generally to carry my present invention into practice by means of a sluice or container in which a medium is confined, and to drive the sluice by means of an exterior motivator unit, yet at times it may be desirable to apply the vibratory force in somewhat different manner. For instance, referring to Figs. 16 and 46, the channel 226 may be suspended freely within the medium confined in container 220, and the vibratory unit (not shown) may be attached to the channel 226 direct, somewhat after the manner shown in connection with the element 365 in Fig. 52, it being understood, of course, that the line of action of the vibratory unit is disposed in the proper angular relation to the channel, so that the channel shall be vibrated back and forth, and up and down. Simultaneously, a local $V_t$ and a transportative component are thereby developed within the medium, while container 220 itself remains substantially without motion. Along similar lines the container 310 in Fig. 43, need not itself be provided with the vibratory unit, but a vibratory unit can be attached directly to either or both the containers 317 and 320, as shown in Fig. 53 so that $V_t$ and the transportative component are manifested within these smaller containers, without necessarily manifesting either $V_t$ or the transportative component in the medium confined in the container 310. Riffle pans or suitable elements each with its individual vibratory unit (not shown) may be arranged in a cascading relation similar to that existing in the case of riffle pans 84, 85 and 73 in Fig. 35.

The configurations of any curvilinear paths described by the particles, do not form smooth curves, but consist of minute serrations similar to those illustrated in Figs. 31, 32 and 33. However, the broken line 357 indicates the directional course of the center line of a path.

In predetermining certain paths of travel for certain particles, the usual object is to lengthen the time of contact between a particle and the medium, or the saving devices submerged in the medium, and also that the particle shall travel progressively towards the discharge end of the sluice.

In Fig. 52 is illustrated a condition where a sluice 361 driven mechanically by an eccentric 362 rotating at the proper speed, contains a medium 363. Suspended by means of vibratory hangers 364 is a supplementary smaller container or sluice 365, which may be submerged in the medium 363, this smaller container being independently driven by means of an eccentric 367, it being understood that the angular relations between the lines of action of the eccentric 362 and 367 and their relative speeds may be varied indefinitely.

In Fig. 53 is illustrated a condition where the main container 368 is stationary and contains a medium 369. Submerged in the medium may be a plate 370, either plain or provided with riffles 371 or other saving devices, suspended for movement in the medium, by means of vibratory hangers 372. The plate may be driven mechanically by an eccentric 373, while material to be separated may be fed through a hopper 374, and in passing over the plate, leave the valuable portions thereof in front of riffles 371 or to be retained by such other suitable saving elements as may be used. The tailings from the plate 370 may be discharged over a lip 375, and be carried up the incline 376 by means of a drag conveyor 377 to be finally discharged over a lip 378 of the container.

In the diagrams, Figs. 49, 50 and 51, is illustrated a typical irregular path which might be followed by a particle when acted upon unsymmetrically by an unsymmetrical placing of the vibratory elements which motivate a sluice. In these diagrams, the vibratory elements 350 to 355 might all occupy positions bearing different angular relations to the center line of sluice 356, thereby imposing the irregular curvilinear path 357 upon a particle. Three major variable conditions may be mentioned, which bring about the irregular travel of a particle through the medium; first, the angular relations between the lines of action of the motivating elements and the center line of the sluice; second, the spacing of the motivating elements longitudinally along the sluice; and third, the degree of flexibility of the walls of the sluice and whether such flexibility is uniform or variable, along the consecutive parts of the walls. The path of a particle is three-dimensional, either regular as in the case of a helix, or irregular as might be the case if successive convolutions were parts of different helices.

One way of varying the flexibility of the walls of the sluice to aid in determining different paths of travel of the particles, is indicated by the tongue and groove joint 358 in Fig. 49, whereby the wall portion 359 is detached from the aligned and adjacent wall portion 360 while the opposite wall 360—1 is continuous.

Reverting to the sluice shown in Figs. 44 and 45, two typical arrangements for supporting the variable-fluid-pressure hoods are shown; first, in the case of hood 340, where it is carried directly by the sluice body 379 and is rigidly attached thereto by means of the cross-channels 380; and second, in the case of hood 344, where it is supported on a framework entirely independent of the sluice. This framework may be composed of standards 381 and cross-pieces 382, from which the hood may be suspended. As a consequence, the hood 344 is stationary, while the hood 340 moves with the sluice. In this case, the sluice is driven mechanically by means of an eccentric 383 carried on a shaft 384. The shaft 384 may be connected to a motor 386 by means of a V-belt drive 385, the motor being provided with any suitable slip-clutch connection, (not shown).

In Fig. 48 is indicated the result of employing a modifying member of other than uniform thickness for graduating the effect of $V_f$ from minimum to maximum, or vice versa. In this figure it is to be noticed that the maximum force effect of $V_f$ occurs at 387 and the minimum force effect at 388. The modifying member 389 is shown tapered, but obviously a modifying member need not have its thickness varying in a regular manner, but might easily be undulating in the character of its thickness.

In the present instance, the container 390 is supposed to be motivated along an inclined line such as indicated by the double-pointed arrow 391, or along an oppositely inclined line such as indicated by the double-pointed arrow 392, the lines of force between 387 and 388 being the same in either case.

Where electromagnetic motivating units are used for driving a sluice, an alternating electric current having a frequency of 60 cycles per second, is a convenient source of power, since it is almost universally available, but higher frequencies than 60 per second may often be employed to advantage. It is to be clearly understood however, that any other suitable power than electric may be used, since pneumatic, hydraulic or mechanical motivating units may readily be adapted to the power requirements of the present invention.

In a series of tests conducted with the present process, oven dried gravel was mixed with Alaskan placer gold of a flaky character, which averaged in screened sizes plus 100 mesh (0.0058 inch opening). The engineer who conducted these tests, commented as follows: "I would say that the machine is a great success as a gold saver.— Again referring to dry gravel, a moisture content of 8% in the tailings would mean that each yard of dry gravel treated would require 246 pounds or 29.5 gallons of water." In other words, when the present process is used to treat dry gravel, the loss of water amounts to only 29.5 gallons. In his report the engineer comments further:

"Regarding water requirements, I would point out that when the gravel is dry, it will absorb a certain amount of water that cannot be recovered even with a de-hydrating riffle. This is the moisture that adheres to each particle of sand and gravel that leaves the sluice. If the quality of sand in the material is relatively high, the tailings will absorb more water than when coarse pebbles predominate. With the quality of material we used, I would say that the average moisture content of the tailings was about 8 per cent. With coarser material it might be reduced to 6 per cent. On the other hand, if fine sand predominates, it might go to 10 per cent. If the gravel is wet when it is fed to the sluice, the water loss in the tailings may be reduced to almost nothing."

This result speaks for itself when compared with the amount of water ordinarily used in treating placer gravels. According to the publication "Gold Dredging in the United States", Bulletin 127, published by the United States Department of the Interior, Bureau of Mines—"The yardage of these dredgers averages 350 yards per hour: hence the water furnished the screen would be about 2800 gallons per cubic yard dug." And again on page 132,—"On the small flume type of dredger with 2½ cubic foot buckets, which has become so popular in Alaska, one 14-inch pump under the low head of about 22 feet is used. This delivers about 5500 gallons per minute and on the basis mentioned above gives 488 inches of water, or 4 cubic yards to the inch, and 3600 gallons per cubic yard."

Having fully described my invention, what I claim is:

1. A method of separating, segregating, and contacting materials capable of being dispersed in a liquid, which comprises introducing the material into a liquid medium in which there is no appreciable liquid flow; dispersing the material within the liquid medium, and passing the material through the liquid medium along serrated paths configurated according to the physical characteristics of the individual units of the dispersed material, thus effecting segregation of material units of like physical characteristics, said serrated paths each comprising diagonal upstrokes during which the material unit concerned and the liquid medium are lifted upwardly, the material unit having substantially no motion relative to the liquid medium, and certain of said serrated paths comprising substantially vertical down-strokes during which the material unit falls through the liquid medium due to gravity, the downstrokes of said serrated paths effecting classification of the material units relative to one another; the said dispersion of material, and the said travel along serrated paths being accomplished by reciprocating the liquid medium and the material contained therein along a line having both a horizontal and a vertical component at least so rapidly that the liquid medium descends through a down-stroke faster than does at least a portion of the material through the same downstroke; and removing the material from the liquid medium in its variously segregated forms.

2. A method of separating, segregating, and contacting materials capable of being dispersed in a liquid, which comprises introducing the material into a liquid medium that is confined on all sides and the bottom and has a free top surface, and in which there is no appreciable liquid flow; maintaining the liquid medium in a dynamic state throughout substantially the entire body thereof to cause an upwardly directed force to be exerted against material passing therethrough; dispersing the material within the liquid medium, and passing the material through the liquid medium along serrated paths configurated according to the physical characteristics of the individual units of the dispersed material, thus effecting segregation of material units of like physical characteristics, said serrated paths each comprising diagonal up-strokes during which the material unit concerned and the liquid medium are lifted upwardly, the material unit having substantially no motion relative to the liquid medium, and certain of said serrated paths comprising substantially vertical down-strokes during which the material unit falls through the liquid medium due to gravity in opposition to the said upwardly directed force of the liquid medium, the downstrokes of said serrated paths effecting classification of the material units relative to one another; the said dynamic state of the liquid medium, the said dispersion of material, and the said travel along serrated paths being accomplished by reciprocating the liquid medium and the material contained therein along a line having both a horizontal and a vertical component at least so rapidly that the liquid medium descends through a down-stroke faster than would be its descent through the same downstroke due to the action of gravity alone; and removing the material from the liquid medium in its variously segregated forms.

3. A method as recited in claim 2 in which the free top surface of the liquid medium is subjected to an artificially maintained pressure differing in value from atmospheric pressure.

4. A method as recited in claim 2 in which the free top surface of the liquid medium is subjected to a plurality of artificially maintained pressures differing in value from atmospheric pressure.

5. A method as recited in claim 2 in which the free top surface of the liquid medium is subjected to varying pressures artificially produced.

6. A method as recited in claim 2 wherein the dynamic state of the liquid medium is locally intensified in different parts of the said liquid medium.

7. A method as recited in claim 2 wherein the liquid medium is relatively inelastic and comprises a lower layer having a density greater than the overlying layer of liquid.

8. A method as recited in claim 2 wherein material having predetermined physical characteristics is automatically removed from the liquid medium at locations separated from the location of discharge of the bulk of the material.

9. A method as recited in claim 2 wherein the dynamic state of the liquid medium is so controlled that the material is caused to pass through the liquid medium in circuitous paths having three dimensions.

10. A method of separating, segregating or contacting material consisting of a liquid medium and particles of another substance dispersed therein or adhering to articles suspended in the liquid, which consists in confining the liquid medium on all sides and on the bottom in a container, reciprocating the container in alternate rapid upstrokes and downstrokes along a line having a vertical component and an appreciable horizontal component, the rate of reciprocation being such that the liquid medium in a downstroke descends through a greater distance than that through which it would fall in the same time due to the action of gravity alone, whereby the liquid medium is vigorously arrested at the lower end of each down-stroke so as to cause an upwardly directed force to be exerted upon the particles dispersed or adhering to articles suspended within the liquid medium.

11. A method as set forth in claim 10, wherein the liquid medium contains solids dispersed therein, the reciprocation resulting in the said liquid medium and solids being advanced in the up-strokes and the liquid medium being retracted in the down-strokes, while the solids fall through the liquid medium in the down-strokes, such fall of the solids being appreciably opposed by the force resulting when the descent of the liquid medium is arrested.

12. A method in accordance with claim 10, wherein the liquid medium contains solids dispersed therein and of different physical characteristics, the reciprocation resulting in the different solids being transported along different serrated paths having inclined strokes upwardly directed and substantially vertical strokes downwardly directed, the descent of the solids in the liquid medium occurring in the downward strokes being appreciably opposed in varying degrees by the force resulting when the liquid medium is arrested.

13. A method as set forth in claim 10, wherein the liquid medium is relatively inelastic and has superimposed thereon a second inelastic liquid medium having a density less than the density of the underlying liquid medium, the said inelastic liquid mediums having dispersed therein solid particles of different physical characteristics, the reciprocation resulting in each liquid segregating solid particles different in physical characteristics from the solid particles segregated in the other liquid medium, whereby the overlying medium may be drawn off as a sludge.

14. A method as set forth in claim 10, wherein the liquid medium is relatively inelastic and contains dispersed therein particles of a relatively elastic liquid which, due to the operation of the force resulting when the descent of the inelastic liquid medium is arrested, are segregated in the form of a mass superposed on the relatively inelastic medium.

15. A method as set forth in claim 10, wherein the force resulting when the descent of the liquid medium is arrested, is locally intensified in different parts of the liquid medium.

16. A method as set forth in claim 10, wherein the liquid medium contains solids dispersed therein, such solids including some that are held partially in suspension in the liquid medium due to the force resulting when the descent of the liquid medium is arrested as well as other solids which by gravity are caused to work their way down through the solids that are held partially in suspension, in opposition to the aforesaid force.

17. A method as set forth in claim 10, wherein the liquid medium contains solids dispersed therein, and those solids having predetermined physical characteristics are automatically discharged from the container due to the fact that such solids when acted upon by the force resulting when the descent of the medium is arrested are caused to insinuate themselves under valve bodies having relatively different physical characteristics.

18. A method as set forth in claim 10, wherein the liquid medium contains solids dispersed therein, solids of predetermined physical characteristics being retained in the liquid medium, and solids of relatively different physical characteristics being automatically discharged at the surface of the liquid medium due to the solids of relatively different physical characteristics coming in contact with a material surface which extends from the bottom of the container to at least the surface of the said liquid medium.

19. A method as set forth in claim 10, wherein the force resulting when the descent of the liquid medium is arrested, is so differentiated in different parts of the liquid medium, that solids within the liquid medium travel through the liquid medium in circuitous paths having three dimensions.

20. A method as set forth in claim 10, wherein the force resulting when the fall of the liquid medium is arrested, is transmitted to another liquid medium in close proximity to the first-mentioned liquid medium, and the said force during transmission is transformed as desired.

GEORGE W. RATHJENS.